(12) United States Patent
Go et al.

(10) Patent No.: US 11,956,103 B2
(45) Date of Patent: Apr. 9, 2024

(54) METHOD FOR TRANSMITTING AND RECEIVING SRS IN WIRELESS COMMUNICATION SYSTEM, AND DEVICE FOR SAME

(71) Applicant: LG ELECTRONICS INC., Seoul (KR)

(72) Inventors: Seongwon Go, Seoul (KR); Jonghyun Park, Seoul (KR); Jiwon Kang, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 466 days.

(21) Appl. No.: 17/279,547

(22) PCT Filed: Oct. 30, 2019

(86) PCT No.: PCT/KR2019/014436
§ 371 (c)(1),
(2) Date: Mar. 24, 2021

(87) PCT Pub. No.: WO2020/091403
PCT Pub. Date: May 7, 2020

(65) Prior Publication Data
US 2021/0344527 A1 Nov. 4, 2021

(30) Foreign Application Priority Data
Oct. 31, 2018 (KR) .......................... 10-2018-0132609

(51) Int. Cl.
*H04L 25/02* (2006.01)
*H04L 5/00* (2006.01)
(Continued)

(52) U.S. Cl.
CPC ........ *H04L 25/0226* (2013.01); *H04L 5/0051* (2013.01); *H04W 72/0446* (2013.01); *H04W 72/1268* (2013.01); *H04W 72/23* (2023.01)

(58) Field of Classification Search
CPC ..... H04W 72/23; H04W 72/20; H04W 72/21; H04W 72/25; H04W 72/121;
(Continued)

(56) References Cited

U.S. PATENT DOCUMENTS

2013/0229989 A1* 9/2013 Natarajan ............ H04L 5/0048
370/329
2017/0126379 A1* 5/2017 Choi ........................ H04W 4/80
(Continued)

FOREIGN PATENT DOCUMENTS

BR 112012019842 B1 * 11/2021 ........... H04L 1/0026
JP 2012503406 2/2012
(Continued)

OTHER PUBLICATIONS

PCT International Application No. PCT/KR2019/014436, International Search Report dated Feb. 10, 2020, 5 pages.

*Primary Examiner* — Phong La
(74) *Attorney, Agent, or Firm* — LEE, HONG, DEGERMAN, KANG & WAIMEY

(57) ABSTRACT

A method for a terminal to transmit a Sounding Reference Signal in a wireless communication system according to an embodiment of the present disclosure comprises: a step for receiving an upper layer message including settings information related to the SRS; a step for receiving downlink control information for triggering the transmission of the SRS, wherein the settings information related to the SRS includes a plurality of settings sets related to at least one among the number of transmissions of the SRS, a subframe, a mapping start symbol of the SRS, and/or the time duration over which the SRS is to be transmitted; and a step for
(Continued)

transmitting the SRS, wherein the DCI includes information representing one of the plurality of settings sets. The SRS is characterized by being an aperiodic SRS and being repeatedly transmitted in a plurality of subframes through a plurality of contiguous symbols.

13 Claims, 14 Drawing Sheets

(51) Int. Cl.
*H04W 72/04* (2023.01)
*H04W 72/0446* (2023.01)
*H04W 72/1268* (2023.01)
*H04W 72/23* (2023.01)

(58) Field of Classification Search
CPC ......... H04W 72/1268; H04W 72/1263; H04W 72/0446; H04W 72/044; H04W 72/0453; H04W 72/0457; H04L 25/0226; H04L 25/0228; H04L 25/0224; H04L 5/0051; H04L 5/0048; H04L 5/005

See application file for complete search history.

(56) References Cited

U.S. PATENT DOCUMENTS

| | | | |
|---|---|---|---|
| 2018/0048498 A1 | 2/2018 | Stern-Berkowitz et al. | |
| 2018/0183556 A1* | 6/2018 | Shin | H04L 5/00 |
| 2018/0191483 A1* | 7/2018 | Yamazaki | H04W 74/0833 |
| 2019/0158205 A1* | 5/2019 | Sheng | H04L 5/0048 |
| 2019/0174466 A1* | 6/2019 | Zhang | H04L 5/0057 |
| 2019/0281588 A1* | 9/2019 | Zhang | H04B 7/0617 |
| 2019/0373585 A1* | 12/2019 | Suzuki | H04L 1/0003 |
| 2020/0067680 A1* | 2/2020 | Nayeb Nazar | H04L 1/1671 |
| 2021/0159966 A1* | 5/2021 | Xi | H04B 7/088 |
| 2021/0344527 A1* | 11/2021 | Go | H04W 72/1268 |

FOREIGN PATENT DOCUMENTS

| | | | | |
|---|---|---|---|---|
| KR | 1020150080523 | | 7/2015 | |
| KR | 20200015761 A | * | 6/2018 | |
| KR | 1020180114129 | | 10/2018 | |
| WO | WO-2016179834 A1 | * | 11/2016 | ......... H04L 27/2601 |
| WO | 2018182241 | | 10/2018 | |
| WO | WO-2018226411 A1 | * | 12/2018 | ............. H04B 1/713 |

* cited by examiner

[FIG. 1]
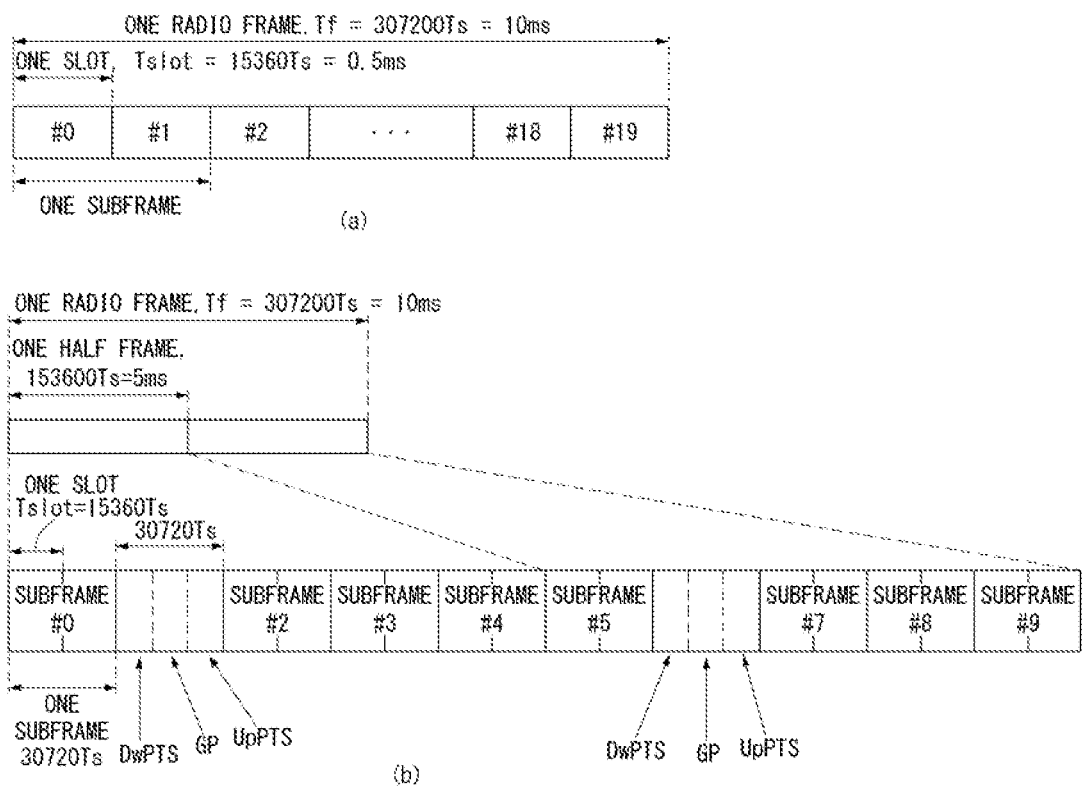

[FIG. 2]
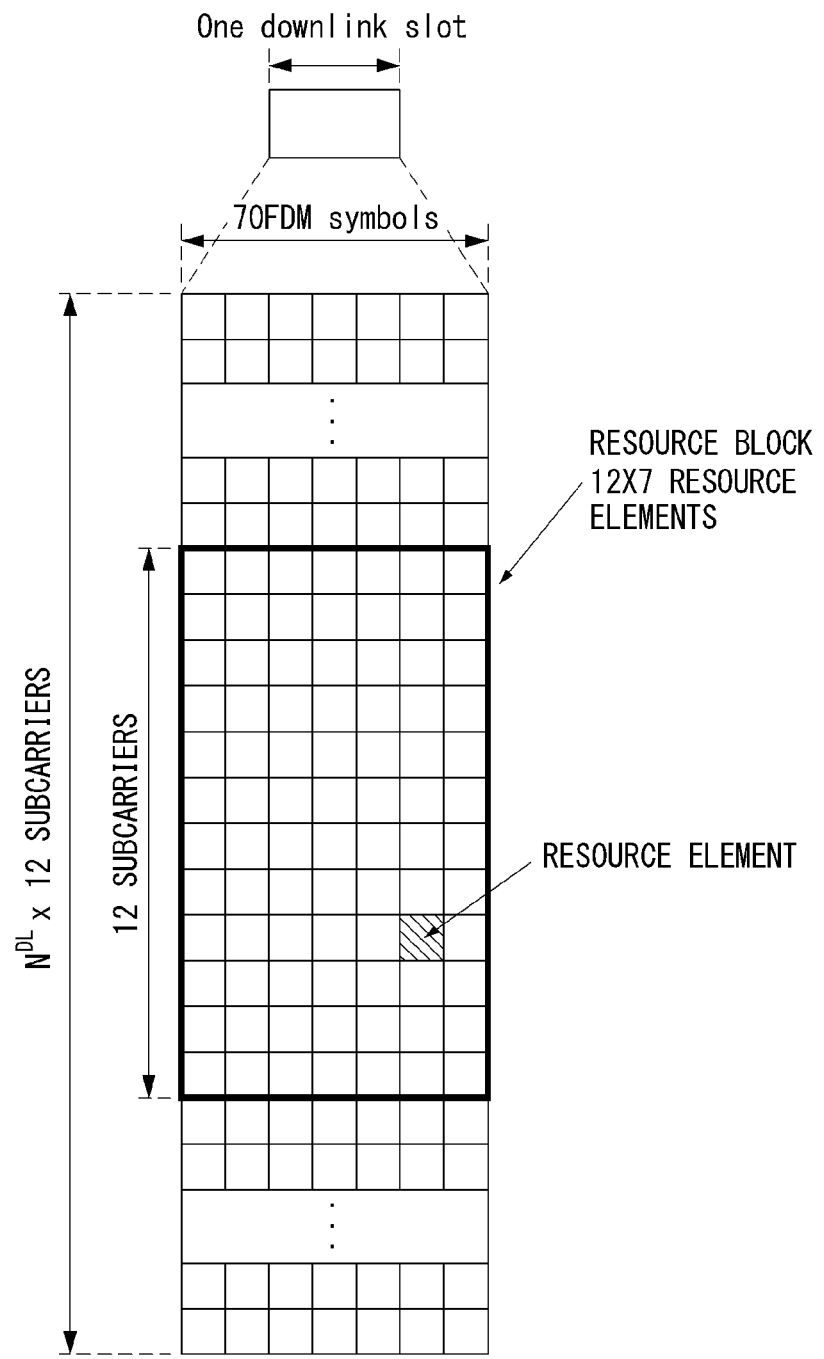

[FIG. 3]
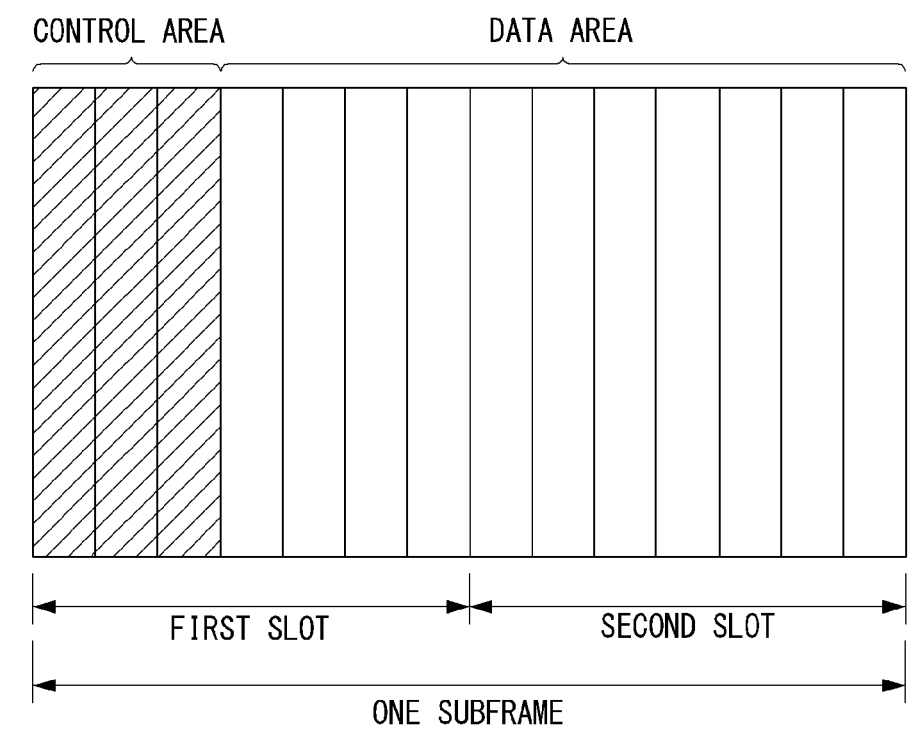
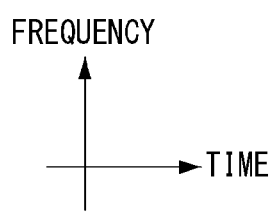

[FIG. 4]
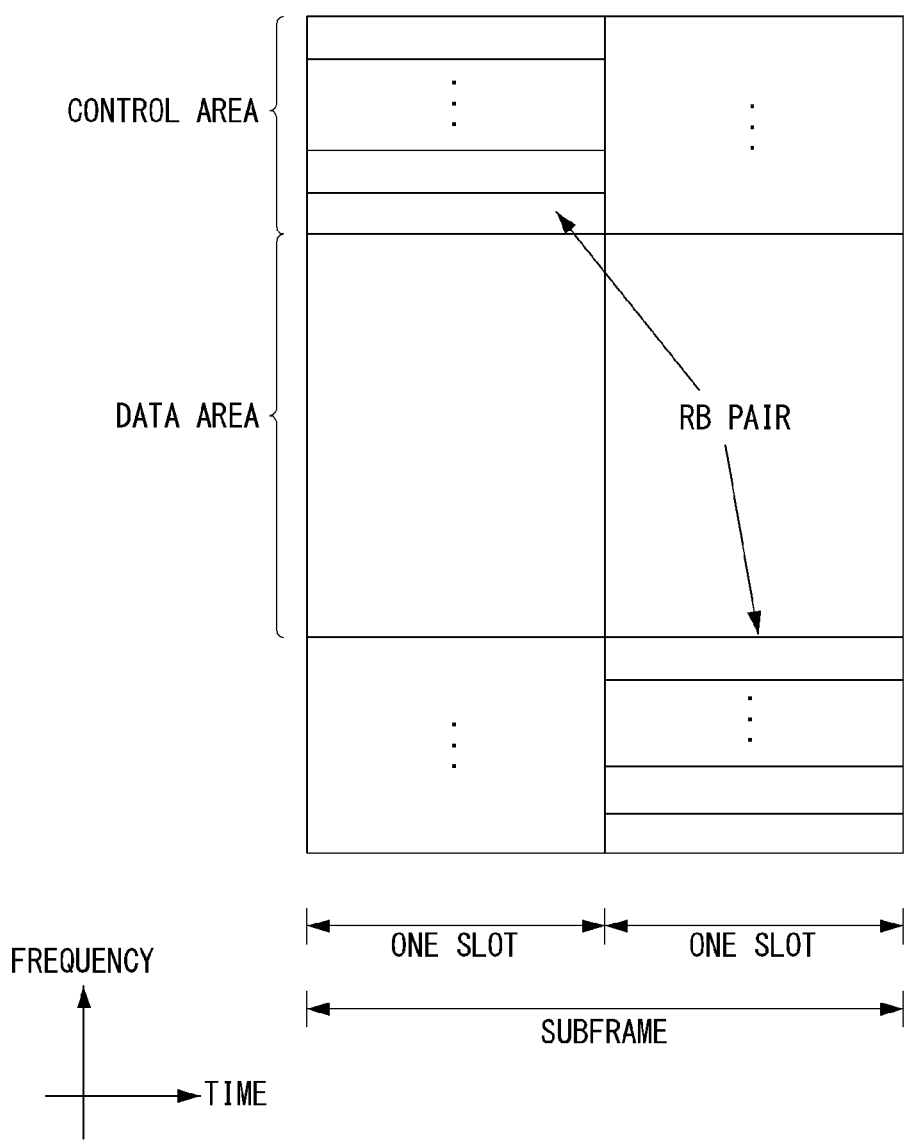

[FIG. 5]
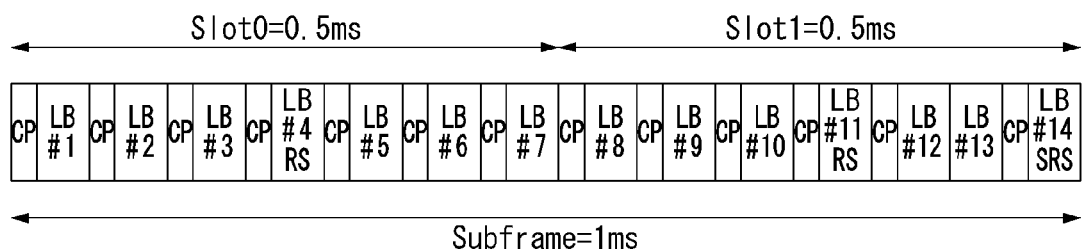

[FIG. 6]
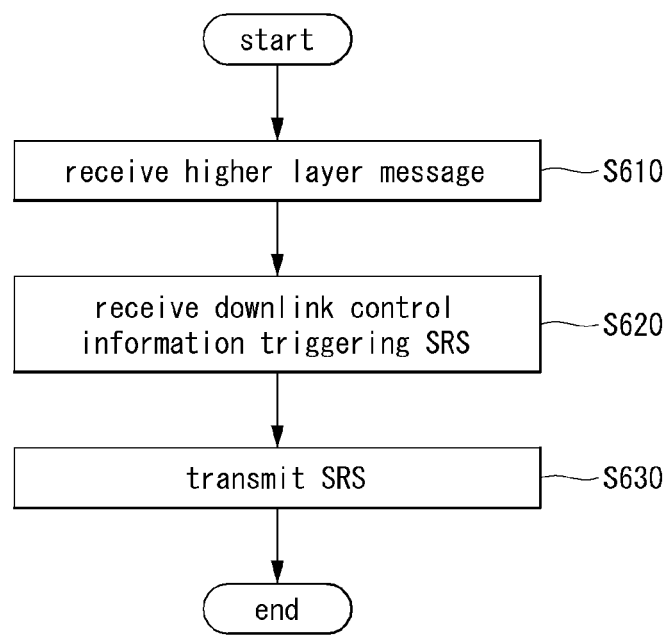

[FIG. 7]
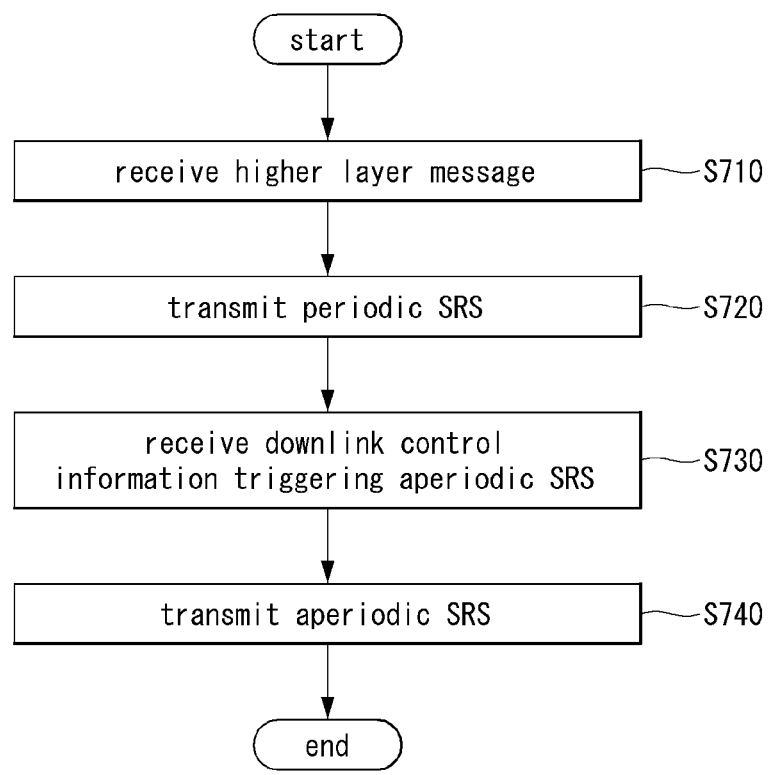

[FIG. 8]
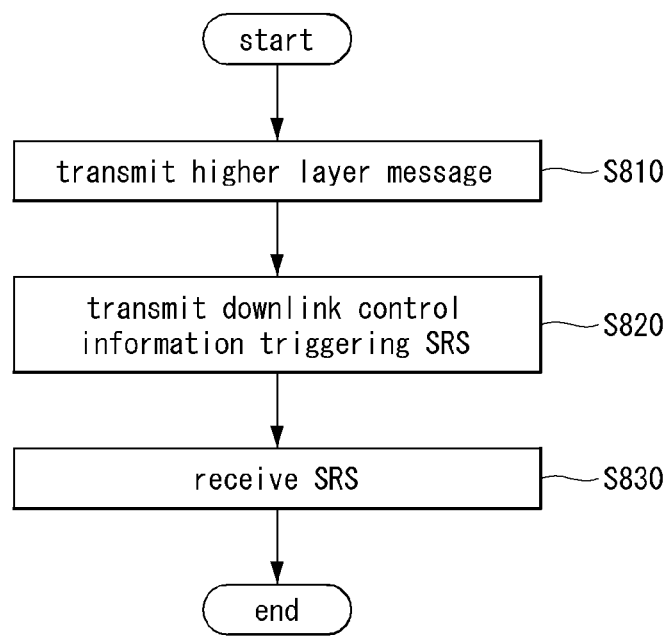

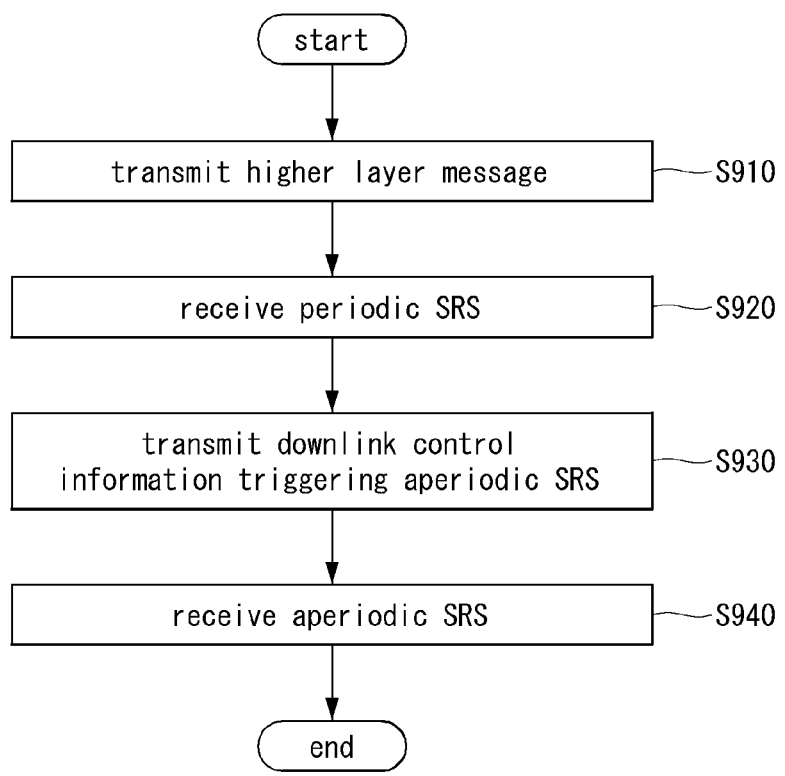
[FIG. 9]

[FIG. 10]
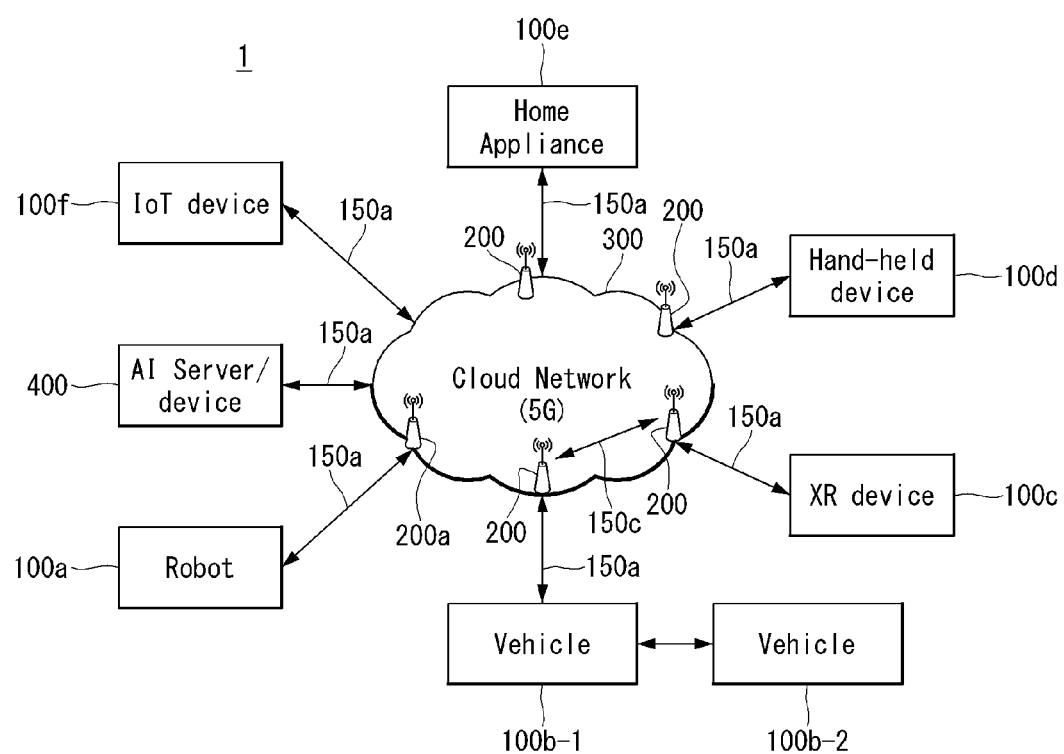

[FIG. 11]
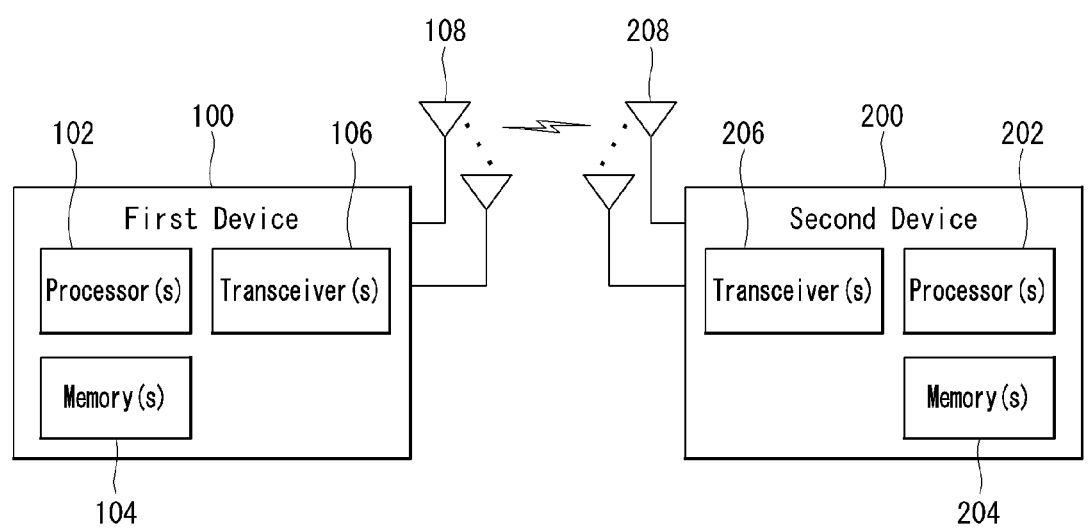

[FIG. 12]
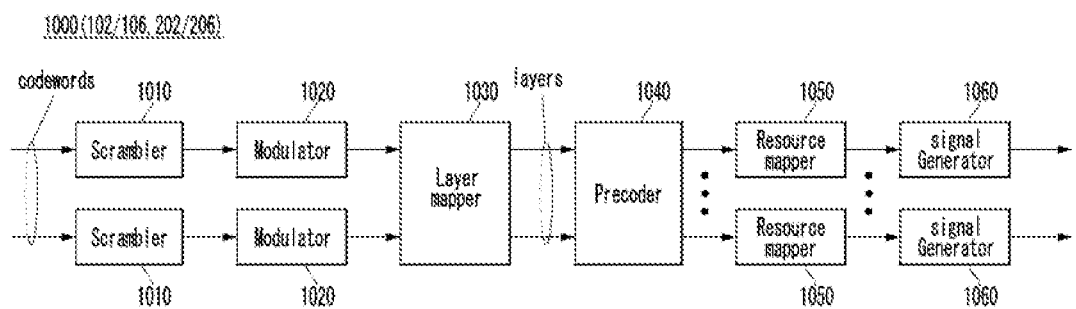

[FIG. 13]
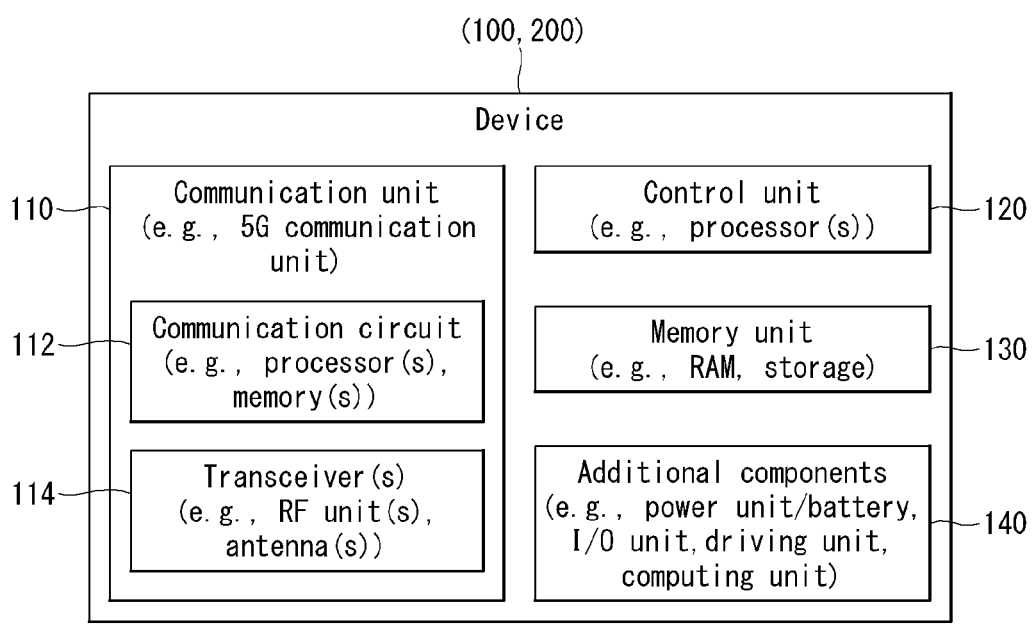

[FIG. 14]
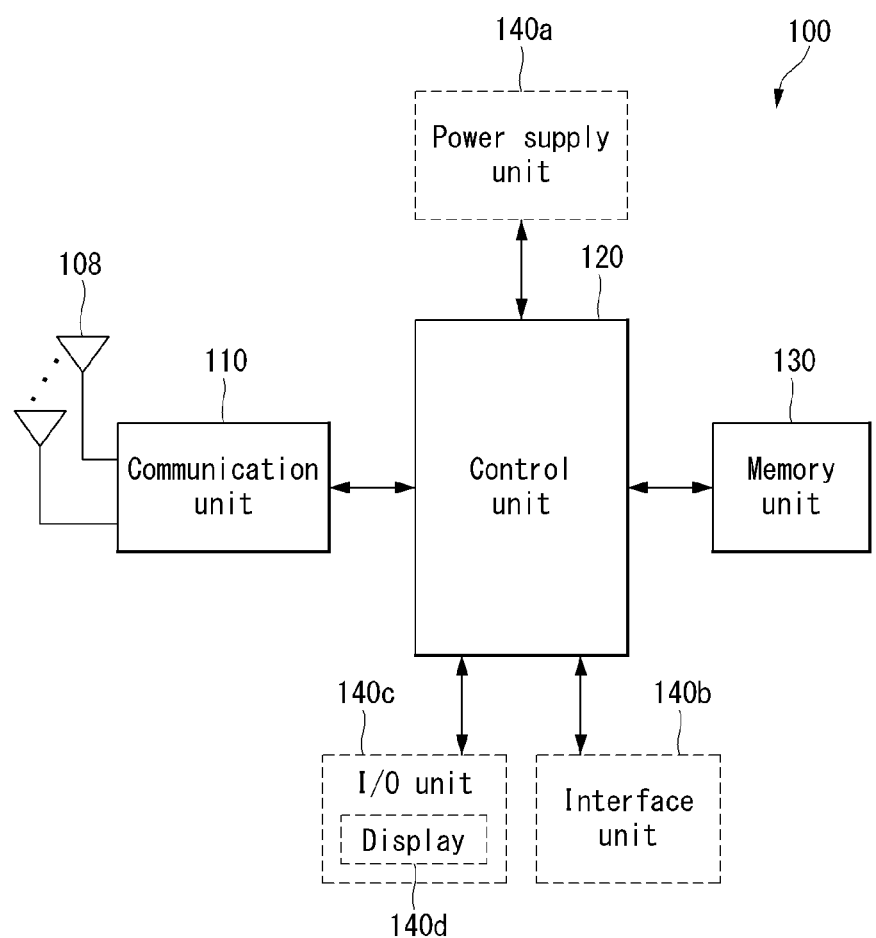

METHOD FOR TRANSMITTING AND RECEIVING SRS IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2019/014436, filed on Oct. 30, 2019, which claims the benefit of earlier filing date and right of priority to KR Application No. 10-2018-0132609, filed on Oct. 31, 2018, the contents of which is incorporated by reference herein in its entirety.

TECHNICAL FIELD

The disclosure relates to methods and devices for transmitting and receiving SRSs in wireless communication systems.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DETAILED DESCRIPTION OF THE DISCLOSURE

Technical Problem

An object of the disclosure is to propose a method and a device for transmitting a sounding reference signal (SRS) of multiple contiguous symbols over a plurality of subframes.

Further, an object of the disclosure is to consider backward compatibility when an SRS is transmitted through a plurality of contiguous symbols.

Further, an object of the disclosure is to reduce overhead when an SRS is transmitted through a plurality of contiguous symbols.

Further, an object of the disclosure is to transmit an SRS to secure resources for transmission of a physical uplink shared channel (PUSCH).

Objects of the disclosure are not limited to the foregoing, and other unmentioned objects would be apparent to one of ordinary skill in the art from the following description.

Technical Solution

According to an embodiment of the disclosure, a method for transmitting a sounding reference signal (SRS) by a user equipment (UE) in a wireless communication system comprises receiving a higher layer message including configuration information related to the SRS, the configuration information related to the SRS including a plurality of configuration sets related to at least one of a number of times of transmission of the SRS, a subframe in which the SRS is transmitted, a mapping start symbol of the SRS, and/or a time duration in which the SRS is transmitted, receiving downlink control information (DCI) triggering the transmission of the SRS, the downlink control information (DCI) including information representing any one of the plurality of configuration sets, and transmitting the SRS based on the downlink control information (DCI). The SRS is an aperiodic SRS (AP-SRS) and is repeatedly transmitted in a plurality of subframes via a plurality of contiguous symbols.

The higher layer message further includes information for subframes in which a cell-specific SRS is configured. a position of a subframe in which the aperiodic SRS is transmitted is associated with a position of at least one of the subframes in which the cell-specific SRS is configured.

The subframe in which the aperiodic SRS is transmitted may be any one of the subframes in which the cell-specific SRS is configured.

The configuration information related to the SRS may further include a subframe offset for a position of any one of the subframes in which the cell-specific SRS is configured. the subframe in which the aperiodic SRS is transmitted may be determined depending on the subframe offset.

A subframe related to the subframe offset among the subframes in which the cell-specific SRS is configured may be a subframe in which a periodic SRS is configured.

The method may further comprise transmitting a periodic SRS. The higher layer message may further include configuration information related to the periodic SRS.

The periodic SRS may be transmitted via one symbol or a plurality of contiguous symbols.

The downlink control information (DCI) may further include information indicating whether to stop the transmission of the periodic SRS.

The downlink control information (DCI) may further include information related to a time when the transmission of the periodic SRS is stopped.

When a physical uplink shared channel (PUSCH) is scheduled in any one of subframes determined according to the configuration information related to the periodic SRS or the configuration information related to the aperiodic SRS, the aperiodic SRS or the periodic SRS may not be transmitted in the subframe.

According to another embodiment of the disclosure, a user equipment (UE) transmitting a sounding reference signal (SRS) in a wireless communication system comprises one or more transceivers, one or more processors, and one or more memories operably connectible to the one or more processors and storing instructions to, when executed by the one or more processors, perform operations.

The operations include receiving a higher layer message including configuration information related to the SRS, the configuration information related to the SRS including a plurality of configuration sets related to at least one of a number of times of transmission of the SRS, a subframe in which the SRS is transmitted, a mapping start symbol of the SRS, and/or a time duration in which the SRS is transmitted, receiving downlink control information (DCI) triggering the transmission of the SRS, the downlink control information (DCI) including information representing any one of the plurality of configuration sets, and transmitting the SRS based on the downlink control information (DCI). the SRS is an aperiodic SRS (AP-SRS) and is repeatedly transmitted in a plurality of subframes via a plurality of contiguous symbols. The SRS is an aperiodic SRS (AP-SRS) and is repeatedly transmitted in a plurality of subframes via a plurality of contiguous symbols.

The higher layer message further includes information for subframes in which a cell-specific SRS is configured. a position of a subframe in which the aperiodic SRS is transmitted is associated with a position of at least one of the subframes in which the cell-specific SRS is configured.

The configuration information related to the SRS may further include a subframe offset for a position of any one of the subframes in which the cell-specific SRS is configured. the subframe in which the aperiodic SRS is transmitted may be determined depending on the subframe offset.

The operations may further comprise transmitting a periodic SRS. The higher layer message may further include configuration information related to the periodic SRS.

The periodic SRS may be transmitted via one symbol or a plurality of contiguous symbols.

The downlink control information (DCI) may further include information indicating whether to stop the transmission of the periodic SRS.

According to still another embodiment of the disclosure, A device includes one or more memories and one or more processors functionally connected with the one or more memories. The one or more processors are configured to control the device to receive a higher layer message including configuration information related to the SRS, the configuration information related to the SRS including a plurality of configuration sets related to at least one of a number of times of transmission of the SRS, a subframe in which the SRS is transmitted, a mapping start symbol of the SRS, and/or a time duration in which the SRS is transmitted, receive downlink control information (DCI) triggering the transmission of the SRS, the downlink control information (DCI) including information representing any one of the plurality of configuration sets, and transmit the SRS based on the downlink control information (DCI). The SRS is an aperiodic SRS (AP-SRS) and is repeatedly transmitted in a plurality of subframes via a plurality of contiguous symbols.

Advantageous Effects

According to an embodiment of the disclosure, an SRS triggered by downlink control information (DCI) is repeatedly transmitted in a plurality of subframes through a plurality of contiguous symbols. Accordingly, the disclosure may reduce the load on the network by aperiodically transmitting an SRS of multiple symbols and enhance the coverage and the capacity of the SRS by transmitting the SRS at least two or more times.

Further, according to an embodiment of the disclosure, the location of the subframe of the SRS is related to the location of at least one subframe among subframes in which a cell-specific SRS has been configured. Specifically, the subframe of the SRS may be any one of subframes in which the cell-specific SRS has been configured or a subframe determined according to a specific subframe offset. The subframe offset is related to a subframe in which a periodic SRS has been configured among the subframes in which the cell-specific SRS has been configured. Accordingly, the disclosure may prevent a collision with a legacy UE that transmits the SRS in a conventional manner in transmitting the aperiodic SRS through a plurality of contiguous symbols.

Further, according to an embodiment of the disclosure, the downlink control information (DCI) includes information indicating whether to stop transmission of the SRS periodically transmitted. That is, when the aperiodic SRS is triggered, transmission of the periodic SRS may be stopped. Accordingly, the disclosure may prevent a collision between the periodic SRS being transmitted and the triggered aperiodic SRS and may reduce the overhead of SRS transmission.

Further, according to an embodiment of the disclosure, when a physical uplink shared channel (PUSCH) is scheduled in any one of subframes determined according to the configuration information related to the aperiodic SRS or the configuration information related to the periodic SRS, the UE does not transmit the aperiodic SRS or the periodic SRS in the corresponding subframe. Accordingly, according to the disclosure, as the SRS is transmitted through a plurality of symbols, it is possible to prevent a shortage of uplink resources for PUSCH transmission and to reduce overhead by stopping the transmission of the SRS while the corresponding PUSCH is transmitted.

Effects of the disclosure are not limited to the foregoing, and other unmentioned effects would be apparent to one of ordinary skill in the art from the following description.

BRIEF DESCRIPTION OF DRAWINGS

FIG. 1 shows the structure of a radio frame in a wireless communication system to which an embodiment of the disclosure may be applied.

FIG. 2 is a diagram illustrating a resource grid for one downlink slot in a wireless communication system to which an embodiment of the disclosure may be applied.

FIG. 3 shows the structure of a downlink subframe in a wireless communication system to which an embodiment of the disclosure may be applied.

FIG. 4 shows the structure of an uplink subframe in a wireless communication system to which an embodiment of the disclosure may be applied.

FIG. 5 illustrates an uplink subframe including an SRS in a wireless communication system to which the disclosure may be applied.

FIG. 6 is a flowchart illustrating a method for transmitting an SRS by a UE in a wireless communication system according to an embodiment of the disclosure.

FIG. 7 is a flowchart illustrating a method for transmitting an SRS by a UE in a wireless communication system according to another embodiment of the disclosure.

FIG. 8 is a flowchart illustrating a method for receiving an SRS by a base station in a wireless communication system according to an embodiment of the disclosure.

FIG. 9 is a flowchart illustrating a method for receiving an SRS by a base station in a wireless communication system according to another embodiment of the disclosure.

FIG. 10 illustrates a communication system 1 applied to the disclosure.

FIG. 11 illustrates a wireless device applicable to the disclosure.

FIG. 12 illustrates a signal processing circuit applied to the disclosure.

FIG. 13 illustrates another example of a wireless device applied to the disclosure.

FIG. 14 illustrates a portable device applied to the disclosure.

MODE FOR DISCLOSURE

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the disclosure should be construed to extend to any alterations, equivalents and substitutes in addition to those which are particularly set out in the accompanying drawings.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single camer-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

General System to which the Disclosure May be Applied

FIG. 1 shows the structure of a radio frame in a wireless communication system to which an embodiment of the disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

(a) of FIG. 1 exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot $2i$ and slot $2i+1$. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

(b) of FIG. 1 shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot $2i$ and slot $2i+1$ of T_slot=15360*T_s=0.5 ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| Special sub-frame con-fig-uration | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the disclosure is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

FIG. 3 shows the structure of a downlink subframe in a wireless communication system to which an embodiment of the disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Sounding Reference Signal (SRS)

An SRS is mainly used for channel quality measurement to perform uplink frequency-selective scheduling and is not related to transmission of uplink data and/or control information. However, the disclosure is not limited thereto and the SRS may be used for various other purposes to enhance power control or to support various start-up functions of recently unscheduled terminals. As an example of the start-up function, an initial modulation and coding scheme (MCS), initial power control for data transmission, timing advance, and frequency semi-selective scheduling may be included. In this case, frequency semi-selective scheduling refers to scheduling that selectively allocates frequency resources to a first slot of a subframe and allocating the frequency resources by pseudo-randomly jumping to another frequency in a second slot.

Further, the SRS may be used for measuring a downlink channel quality under the assumption that radio channels are reciprocal between the uplink and the downlink. The assumption is particularly effective in a time division duplex (TDD) system in which the uplink and the downlink share the same frequency spectrum and are separated in a time domain.

The SRS subframes transmitted by a certain UE in a cell may be represented by a cell-specific broadcast signal. A 4 bit cell-specific 'srsSubframeConfiguration' parameter represents 15 available subframe arrays through which the SRS may be transmitted over each radio frame. The arrays provide flexibility for adjustment of SRS overhead according to a deployment scenario.

A 16-th array completely turns off a switch of the SRS in the cell and this is primarily suitable for a serving cell that serves high-speed terminals.

FIG. 5 illustrates an uplink subframe including an SRS in a wireless communication system to which the disclosure may be applied.

Referring to FIG. 5, the SRS is continuously transmitted on the last SC-FDMA symbol on the arranged subframe. Therefore, the SRS and the DMRS are located in different SC-FDMA symbols.

PUSCH data transmission is not allowed in a specific SC-FDMA symbol for SRS transmission and as a result, when the sounding overhead is the highest, that is, even if SRS symbols are included in all subframes, the sounding overhead does not exceed approximately 7%.

Each SRS symbol is generated by a basic sequence (random sequence or a sequence set based on Zadoff-Ch (ZC)) for a given time unit and frequency band, and all terminals in the same cell use the same basic sequence. In this case, the SRS transmissions from a plurality of UEs in the same cell at the same time in the same frequency band are orthogonal by different cyclic shifts of the basic sequence, and are distinguished from each other.

By assigning different basic sequences to respective cells, the SRS sequences from different cells may be distinguished, but orthogonality between different basic sequences is not guaranteed.

SRS Transmission in NR System

In NR systems, an SRS sequence for SRS resources may be generated by Equation 1 below.

$$r^{(p_i)}(n,l')=r_{u,v}^{(\alpha_i,\delta)}(n)$$

$$0 \leq n \leq 271 \cdot N_{sc}^{RB}/K_{TC}$$

$$l' \in \{0,1,\ldots,N_{symb}^{SRS}-1\} \qquad \text{[Equation 1]}$$

In Equation 1, $r_{u,v}^{(\alpha_i,\delta)}$ denotes the sequence number (v) of SRS and the sequence set by the sequence group (u), and the transmission comb (TC) number, $K\_TC(K_{TC})$, may be included in the higher layer parameter, SRS-Transmission-Comb.

Further, for antenna port $p_i$, the cyclic shift (SC) $\alpha_i$ may be given as in Equation 2 below.

$$\alpha_i = 2\pi \frac{n_{SRS}^{cs,i}}{n_{SRS}^{cs,max}} \quad \text{[Equation 2]}$$

$$n_{SRS}^{cs,i} = \left(n_{SRS}^{cs} + \frac{n_{SRS}^{cs,max} p_i}{N_{ap}}\right) \bmod n_{SRS}^{cs,max}$$

In Equation 2, $n_{SRS}^{cs} \in \{0, 1, \ldots, n_{SRS}^{cs,max}\}$ may be given by the higher layer parameter SRS-CyclicShiftConFIG. Further, the maximum value of the cyclic shift, if K_TC is 4, may be 12 (i.e., $n_{SRS}^{sc,max}=12$) and, if K_TC is 2, 8 (i.e., $n_{SRS}^{cs,max}=8$).

The sequence group $(u)(u=(f_{gh}(n_{s,f}^\mu, l')+n_{ID}^{SRS} \bmod 30) \bmod 30)$ and the sequence number (u) may comply with the higher layer parameter SRS-GroupSequenceHopping. Further, the SRS sequence identifier $n_{ID}^{SRS}$ may be given by the higher layer parameter SRS-SequenceId. l' (i.e., l'$\in \{0, 1, \ldots, N_{symb}^{SRS}-1\}$) denotes the OFDM symbol number in the SRS resource.

At this time, if SRS-GroupSequenceHopping is 0, group hopping and sequence hopping are not used, which may be represented as in Equation 3 below.

$$f_{gh}(n_{s,f}^\mu, l') = 0 \quad \text{[Equation 3]}$$
$$v = 0$$

In Equation 3, f_gh(x, y) denotes sequence group hopping, and v denotes sequence hopping.

Or, if SRS-GroupSequenceHopping is 1, group hopping, not sequence hopping, is used, and this may be expressed as in Equation 4.

$$f_{gh}(n_{s,f}, l') = \left(\sum_{m=0}^{7} c\left(8\left(n_{s,f}^\mu N_{symb}^{SRS} + l'\right) + m\right) \cdot 2^m\right) \bmod 30 \quad \text{[Equation 4]}$$
$$v = 0$$

In Equation 4, f_gh(x, y) denotes sequence group hopping, and v denotes sequence hopping. c(i) denotes the pseudo-random sequence and may be initialized as $c_{init} = \lfloor n_{ID}^{SRS}/30 \rfloor$ at the start of each radio frame.

Or, if SRS-GroupSequenceHopping is 2, sequence hopping, not group hopping, is used, and this may be expressed as in Equation 5.

$$f_{gh}(n_{s,f}, l') = 0 \quad \text{[Equation 5]}$$

$$v = \begin{cases} c(n_{s,f} N_{symb}^{SRS} + l') & M_{sc,b}^{SRS} \geq 3 N_{sc}^{RB} \\ 0 & \text{otherwise} \end{cases}$$

In Equation 5, f_gh(x, y) denotes sequence group hopping, and v denotes sequence hopping. c(i) denotes the pseudo-random sequence and may be initialized as $c_{init} = \lfloor n_{ID}^{SRS}/30 \rfloor \cdot 2^5 + (n_{ID}^{SRS} + \Delta_{ss}) \bmod 30$ at the start of each radio frame (where, $\Delta_{ss} \in \{0, 1, \ldots, 29\}$).

Sounding Reference Signal (SRS) Hopping

SRS hopping may be performed only upon periodic SRS triggering (e.g., triggering type 0). Further, allocation of SRS resources may be provided according to a pre-defined hopping pattern. In this case, the hopping pattern may be designated UE-specifically via higher layer signaling (e.g., RRC signaling) and no overlap is allowed.

Further, SRS is frequency-hopped using the hopping pattern in every subframe where cell-specific and/or UE-specific SRS is transmitted, and the start position and hopping equation in the frequency domain of SRS hopping may be interpreted via Equation 6 below.

$$k_0^{(p)} = \bar{k}_0^{(p)} + \sum_{b=0}^{B_{SRS}} {'}K_{TC} M_{sc,b}^{RS} n_b \quad \text{[Equation 6]}$$

$$n_b = \begin{cases} \lfloor 4 n_{RRC}/m_{SRS,b} \rfloor \bmod N_b & b \leq b_{hop} \\ \{F_b(n_{SRS}) + \lfloor 4 n_{RRC}/m_{SRS,b} \rfloor\} \bmod N_b & \text{otherwise} \end{cases}$$

$$F_b(n_{SRS}) = \begin{cases} (N_b/2) \left\lfloor \frac{n_{SRS} \bmod \Pi_{b'=b_{hop}}^b N_{b'}}{\Pi_{b'=b_{hop}}^{b-1} N_{b'}} \right\rfloor + \\ \quad \left\lfloor \frac{n_{SRS} \bmod \Pi_{b'=b_{hop}}^b N_{b'}}{2 \Pi_{b'=b_{hop}}^{b-1} N_{b'}} \right\rfloor & \text{if } N_b \text{ even} \\ \lfloor N_b/2 \rfloor \lfloor n_{SRS} / \Pi_{b'=b_{hop}}^{b-1} N_{b'} \rfloor & \text{if } N_b \text{ odd} \end{cases}$$

$$n_{SRS} = \begin{cases} 2 N_{SP} n_f + 2(N_{SP}-1) \left\lfloor \frac{n_s}{10} \right\rfloor + \left\lfloor \frac{T_{offset}}{T_{offset\_max}} \right\rfloor, \\ \lfloor (n_f \times 10 + \lfloor n_s/2 \rfloor)/T_{SRS} \rfloor, \end{cases}$$

for 2 ms SRS periodicity of frame structure type 2 otherwise

In Equation 6, nSRS means the hopping interval in the time domain, and Nb denotes the number of branches allocated to tree level b where b may be determined by the BSRS configuration in the dedicated RRC.

Physical Uplink Shared Channel

Mapping to resource element (k, l) corresponding to a physical resource block allocated for PUSCH transmission in a subframe is required to satisfy the following criteria.

Not used for transmission of reference signals.

Not part of the last SC-FDMA symbol in the subframe when the UE transmits the SRS in the same subframe in the same serving cell.

Not part of the last SC-FDMA symbol in the subframe configured of a cell-specific SRS for non-BL/CE UE and BL/CE UE (bandwidth reduced low complexity/coverage enhancement UE) in CEModeA if PUSCH transmission partially or completely overlaps the cell-specific SRS bandwidth.

Not part of the SC-FDMA symbol reserved for SRS transmission possible in a UE-specific aperiodic SRS subframe in the same serving cell.

Not part of the SC-FDMA symbol reserved for SRS transmission possible in a UE-specific periodic SRS subframe in the same serving cell when the UE is composed of a plurality of TAGs.

Not part of the first SC-FDMA symbol in the subframe when the related DCI indicates the PUSCH start position '01', '10', or '11' and does not indicate PUSCH mode 2.

Not part of the first SC-FDMA symbol in the second slot of the subframe if the relevant DCI indicates the PUSCH start position '01', '10' or '11' and PUSCH mode 2.

Not part of the last SC-FDMA symbol in the subframe when the related DCI indicates PUSCH end symbol '1' and does not indicate PUSCH mode 3.

Not part of the second slot in the subframe when the related DCI indicates the PUSCH end symbol '0' and PUSCH mode 3.

Not part of SC-FDMA symbols 5 to 13 in the subframe when the related DCI indicates the PUSCH end symbol '1' and PUSCH mode 3.

Mapping to resource element (k, l) increases in the order of index k and index l. Mapping starts at the first slot of the uplink subframe except for slot-PUSCH, subslot-PUSCH transmission, or PUSCH mode 2.

In the case of PUSCH transmission using sub-PRB allocation for BL/CE UE, mapping starts from all valid uplink subframes constituting the UL resource unit.

In the case of slot-PUSCH, mapping starts at slot l=0 allocated for transmission.

In the case of PUSCH mode 2, the mapping will start at the second slot l=0 of the subframe allocated for transmission.

In the case of Subslot-PUSCH, mapping starts at symbol 1 depending on the uplink subslot number of the subframe allocated for transmission and the DMRS-pattern field of the uplink DCI format related to Table 3 below. In Table 3 below, when the UE indicates capability ul-pattern-ddd-r15, "4" is applied as the starting symbol index for subslot #5.

Table 3 below summarizes the indexes of start symbols for subslot-PUSCH transmission.

TABLE 3

| DMRS-pattern field in uplink-related DCI format | Uplink subslot number | | | | | |
| --- | --- | --- | --- | --- | --- | --- |
| | #0 | #1 | #2 | #3 | #4 | #5 |
| 00 | 1 | 4 | 6 | 1 | 3 | 5 |
| 01 | 0 | 3 | 5 | 0 | 2 | 4 |
| 10 | — | 3 | — | 0 | 2 | — |
| 11 | — | 3 | — | — | 2 | — |

In the case of a subslot-PUSCH scheduled semi-persistently with a period of 1 subslot, mapping starts at symbol 1 according to the DMRS pattern field of the related uplink DCI format according to Table 5 below.

Table 4 below summarizes the starting symbol indexes for sub-slot-PUSCH transmission in the case of semi-permanent scheduling with periodicity constituted of one sub-slot.

TABLE 4

| DMRS-pattern field in uplink-related DCI format | Uplink subslot number | | | | | |
| --- | --- | --- | --- | --- | --- | --- |
| | #0 | #1 | #2 | #3 | #4 | #5 |
| 00 | 1 | 4 | 6 | 1 | 3 | 5 |
| 10 | 1 | 3 | 6 | 0 | 3 | 5 |

In the case of subslot-PUSCH and semi-permanent scheduling whose periodicity is longer than 1 subslot, mapping starts at symbol 1 according to the first row of Table 4 (i.e., corresponding to the DMRS pattern field set to '00').

In the case of UpPTS (Uplink Pilot Timeslot), mapping starts at symbol 1, and when dmrsLess-UpPts is set to true, mapping ends at symbol l=symPUSCH_UpPts of the second slot in the special subframe. When dmrsLess-UpPts is set to false, mapping ends at symbol l=symPUSCH_UpPts+1 of the second slot in the special subframe.

For BL/CE UE, PUSCH transmission is limited as follows:

In the case of CEModeA, if the PUSCH is associated with C-RNTI or SPS C-RNTI and the higher layer parameter ce-pusch-maxBandwidth-config is set to 5 MHz, the maximum number of PRBs allocatable for the PUSCH is 24 PRBs. Allocatable PRBs include odd-numbered PRBs in the center of the uplink system bandwidth in the case of odd total uplink PRBs and PRBs belonging to a narrow bandwidth. When resource allocation or frequency hopping causes PUSCH resource allocation outside the allocable PRBs, PUSCH transmission of the subframe is cut off.

For all other cases, the maximum number of allocatable PRBs for PUSCH is 6 PRBs limited to one of the narrow bands.

In the case of the CEModeB BL/CE UE, the resource elements of the last SC-FDMA symbol of the subframe composed of a cell-specific SRS are counted in PUSCH mapping, but is not used for transmission of PUSCH.

In the case of a BL/CE UE, the SC-FDMA symbols influenced when one or more SC-FDMA symbols are empty due to a guard period for narrowband or wideband regression are counted in PUSCH mapping, but are not used for transmission of PUSCH.

In the case of a UE configured with SRS carrier switching, operations related to PUSCH transmission are as follows.

In a carrier without PUSCH/PUCCH, if the first symbol of the subframe overlaps with SRS transmission (including an interrupt due to an uplink or downlink RF retransmission time), the first SC-FDMA symbol should be counted in PUSCH mapping, but is not used for the transmission of the PUSCH.

If the last symbol of the subframe is counted in PUSCH mapping, and the last symbol of the subframe overlaps with SRS transmission of the carrier without PUSCH/PUCCH, the last SC-FDMA symbol should be counted in PUSCH mapping, but is not used for transmission of PUSCH.

If the last symbol of the subframe is not counted in PUSCH mapping and the last second symbol of the subframe overlaps with SRS transmission in the carrier without PUSCH/PUCCH, PUSCH mapping in the second to last SC-FDMA symbols is counted in PUSCH mapping but is not used for PUSCH transmission.

In the case of a UE configured in PUSCH mode 1, when the DCI indicates that PUSCH mode 1 is to be enabled and transmission of the corresponding PUSCH starts at the second slot of the subframe, the resource element in the first slot of the subframe is counted in PUSCH mapping but is not used for transmission of the PUSCH.

Contents related to the trigger type of SRS and a relationship between SRS transmission and PUSCH (PUCCH) transmission are described in detail below.

The sounding reference signal (SRS) may be transmitted in the last symbol of each subframe in the frequency division duplex system (FDD).

In the time division duplex (TDD) system, in addition to SRS transmission in an uplink subframe, an SRS having one or two symbols may be transmitted according to a special subframe configuration using uplink pilot timeslot (UpPTS) in a special subframe.

In the special subframe, an SRS having 2 or 4 symbols may be transmitted according to whether an SC-FDMA symbol is configured for additional uplink use in addition to the existing UpPTS.

Trigger types for the SRS are divided into type 0 and type 1 according to time domain characteristics. Type 0 is a periodic SRS based on a higher layer configuration, and type 1 is an aperiodic SRS triggered by DCI.

In relation to the transmission of the SRS and the transmission of the PUSCH, the UE and the base station may operate as follows.

The base station may configure a combination of subframe numbers in which a cell specific SRS has been allocated in the UE in a normal subframe in a cell specific manner.

When performing PUSCH resource element mapping in the subframe to which the cell specific SRS has been allocated, the UE protects the SRS by leaving the last symbol in which the cell specific SRS has been configured blank regardless of whether a UE specific SRS is configured. Further, when PUSCH transmission and SRS transmission collide in the uplink pilot timeslot (UpPTS) of a TDD special subframe, no SRS is transmitted. Even in the case of carrier aggregation, if the SRS of the first serving cell and the PUSCH of the second serving cell overlap the same symbol in the time domain, the UE may drop the SRS.

The operation of the UE related to the transmission of the SRS and the transmission of the PUCCH is described below.

When the SRS and the PUCCH format 2 series (2/2a/2b) collide in the same subframe of the same serving cell, the UE may operate as follows.

In the case of an SRS triggered by type 0, the UE does not transmit the corresponding SRS.

In the case of an SRS triggered by type 1, 1) the UE does not transmit the corresponding SRS when it collides with a PUCCH including HARQ-ACK, and 2) the UE may transmit the corresponding SRS when it collides with PUCCH format 2 including no HARQ-ACK.

The UE may simultaneously transmit the SRS and the PUCCH in the same subframe using a shortened PUCCH. Specifically, the shortened PUCCH is PUCCH format 1 (1/1a/b) and format 3, 4, and 5, and the data of uplink control information (UCI) is not included in the last symbol of the corresponding subframe.

In the shortened PUCCH, whether to transmit simultaneously with the SRS is set by the higher layer parameter ackNackSRS-SimultaneousTransmission.

When simultaneous transmission of SRS and shortened PUCCH is not set (when ackNackSRS-SimultaneousTransmission is FALSE), if the SRS collides with the PUCCH including a positive SR and/or HARQ-ACK in the same subframe (or slot or subslot), the UE does not transmit the SRS.

Even when simultaneous transmission of the SRS and the shortened PUCCH is set (when ackNackSRS-SimultaneousTransmission is TRUE), if the SRS overlaps at the symbol level with the shortened PUCCH including HARQ-ACK and/or positive SR, the UE does not transmit the SRS.

In the case of PUCCH format 1 series and format 3, in the subframe in which a cell-specific SRS has been configured, the format of the shortened PUCCH may be used regardless of whether a UE-specific SRS is configured. In the case of PUCCH format 4/5, in the subframe in which a cell-specific SRS has been configured, the format of the shortened PUCCH is used if it overlaps the bandwidth of the cell-specific SRS regardless of whether the UE-specific SRS is configured.

Upon enhancing the coverage and capacity of the SRS to effectively utilize UL/DL reciprocity, the following may be considered. A multi-symbol SRS may be configured not only in the special subframe of the TDD system but also in the normal subframe of the TDD or FDD system. Due to the multi-symbol SRS, a collision may occur with the PUCCH that is an uplink (UL) control channel or a PUSCH that is an uplink data channel.

A method for transmitting and receiving an uplink channel considering multi-symbol SRS configuration is described below in detail.

In a normal subframe in the legacy TDD/FDD systems, an SRS for a specific cell (cell-specific SRS) and an SRS for a specific UE (UE-specific SRS) each may be configured only in one symbol (last symbol) in one subframe. However, even in a normal subframe for SRS coverage expansion, in the case of a cell-specific SRS, a configuration may be made per slot (0.5 ms) or per subframe (1 ms) and, in the case of a UE-specific SRS, multiple symbols may be configured in the region of the cell-specific SRS.

Hereinafter, for convenience purposes in the disclosure, the legacy SRS configurations following the SRS transmission resource configuration and relevant configurations for the conventional purposes (e.g., uplink adaptation, uplink timing measurement, uplink power control, and uplink channel state information acquisition) are collectively referred to as a first SRS configuration.

For additional purposes, such as obtaining downlink channel state information according to uplink/downlink reciprocity and enhancing coverage/capacity, configurations related to a multi-symbol SRS having a granularity of one slot are collectively referred to as a second SRS configuration.

The terms are separated for convenience of description, and the technical spirit of the disclosure is not limited to the terms. Further, the embodiments and/or methods described in the disclosure are differentiated solely for ease of description, and some components in any one method may be replaced, or combined with components of another method.

Conventionally, a multi-symbol SRS is configured for a special subframe, so that the SRS may be enhanced. For SRS transmission, an additional uplink pilot time slot (UpPTS) symbol is introduced, and the additional UpPTS is indicated to the UE via 2 symbols or 4 symbols through a higher layer parameter. The new RRC parameter value for the additional UpPTS is configured separately from the legacy SRS configuration, and since only one of the two SRS regions may be selectively configured in the UE, there is no possibility of overlapping with the legacy SRS region.

Referring to an example in which a multi-symbol SRS is configured in the special subframe, a region according to a second SRS configuration for transmitting an additional SRS (hereinafter, a second SRS region) may be configured without overlapping, at the symbol level, with a region according to a first SRS configuration for transmitting a legacy SRS (hereinafter, a first SRS region). Further, the second SRS region and the first SRS region may be configured selectively for the UE.

In the disclosure, unless otherwise limited, SRS region refers to a cell specific SRS region. Further, the first SRS region and the second SRS region also refer to cell-specific SRS regions unless otherwise limited. However, this is merely for ease of description and is not intended for limiting the technical spirit of the disclosure. The SRS region may be a cell specific SRS region or a UE specific SRS region. Each of the first SRS region and the second SRS region may be a UE specific SRS region.

To enhance the SRS, a method similar to the conventional method may be applied to the second SRS configuration.

Since the minimum unit (granularity) of SRS resource allocation for a cell is one slot, only the second slot (7 OFDM symbols) of the subframe may be configured as the second SRS region, as default. However, for a simplified system design while avoiding problems with, e.g., slot- PUSCH/PUCCH, the case in which the minimum unit of the second SRS region is one subframe should also be considered.

Hereinafter, embodiments related to considerations for transmitting an uplink shared channel (PUSCH) in a subframe in which an SRS having a plurality of symbols is configured according to the second SRS configuration is described in more detail. Further, the embodiments described below are differentiated solely for ease of description, and some components in any one embodiment may be replaced, or combined with components of another embodiment.

Embodiment 1

The second SRS configuration for a cell specific SRS may be performed independently from the first SRS configuration (legacy SRS configuration) by RRC signaling. Further, even in the case of UE specific SRS configuration, the second SRS configuration may be configured by RRC signaling that is distinguished from the first SRS configuration.

Embodiment 2

Symbol-level granularity of the second SRS region may be 1 slot or 1 subframe. However, given the flexibility of resource region allocation for SRS transmission, the second SRS region may be configured in less than one slot (i.e., a plurality of symbols).

The second SRS region may have a granularity of 1 slot or 1 subframe in a subframe, but whether the second SRS region is extended to the last symbol in the corresponding subframe needs to be careful when the case of the additional UpPTS is taken into consideration.

Excluding the last symbol in all cases in which the second SRS region is configured may simplify system design and avoid potential co-existence issues. This is because the first SRS region may be protected like the legacy LTE system considering randomized interference between cells.

According to another embodiment, the base station may UE-specifically configure or indicate whether the second SRS region includes the first SRS region of the subframe.

Further, the subframe in which the second SRS region is configured may be configured in association with the subframe in which the first SRS region is configured. For example, a second SRS region may be configured in a subframe belonging to a subset of a combination of subframes in which the first SRS region is configured. In this case, when the transmission of the physical uplink shared channel is scheduled in a subframe in which the second SRS region is configured, the UE supporting the second SRS configuration may rate-match both the first SRS region and the second SRS region and transmit the physical uplink shared channel.

Embodiment 3

It should be determined whether the cell-specific SRS region according to the second SRS configuration may overlap with the cell-specific SRS region (i.e., the last symbol) according to the first SRS configuration considering inter-cell interference.

Rate-matching of the physical uplink shared channel (PUSCH) may be extended considering the second SRS region. That is, rate-matching may be performed considering both the first SRS region and the second SRS region for the physical uplink shared channel (PUSCH).

For example, for a PUSCH scheduled on a subframe in which only the first SRS region is configured, rate-matching may be performed on the last symbol. If 1-slot granularity is assumed, for a PUSCH scheduled on a subframe in which only the second SRS region is configured, rate-matching may be performed on the second slot of the subframe.

The PUSCH scheduled in the subframe in which the first SRS region is configured may be transmitted through the whole subframe except for the last symbol. The PUSCH scheduled in the subframe in which the second SRS region is configured may be transmitted in a 'slot-PUSCH' format.

In the case of a UE supporting the second SRS configuration, transmission of rate-matched PUSCH may be operated according to the following three options.

Option 1: Even if only the second SRS region is configured, the UE may perform rate-matching considering both the second SRS region and the first SRS region.

Specifically, the second SRS region may not include the first SRS region. When transmission of the PUSCH is scheduled in a subframe in which the second SRS region is configured, the UE may perform rate-matching considering the first SRS region.

For example, the second SRS region may consist of 6 symbols except for the last symbol in the second slot of the subframe. Even if only the second SRS region is configured, the UE may perform rate-matching on the whole second slot (seven symbols) regardless of whether the first SRS region (last symbol) is configured and transmit the PUSCH.

Option 2-1): When transmission of the PUSCH is scheduled in a subframe in which the second SRS region is configured, the UE may perform rate-matching only on the second SRS region and transmit the PUSCH. For example, the second SRS region may consist of 6 symbols except for the last symbol in the second slot of the subframe. The UE may perform rate-matching on only 6 symbols of the second slot and transmit the PUSCH.

The base station demodulates the PUSCH via extrapolation using a demodulation reference signal of the corresponding subframe. The PUSCH transmitted through the last symbol of the subframe is transmitted away from the PUSCH transmitted through the first slot (7 symbols) in the time domain, but the base station uses the demodulation reference signal of the subframe upon demodulating the PUSCH.

The UE may determine whether to perform rate-matching on the last symbol of the subframe for PUSCH transmission according to whether the first SRS region is configured in the corresponding subframe. Alternatively, the base station may configure or indicate such UE operation.

Option 2-2): As in option 2-1, when PUSCH scheduling occurs in a subframe in which the second SRS region is configured, the UE may rate-match only the second SRS region and transmit the PUSCH.

In the case of option 2-1, it is assumed that PUSCH scheduling occurs in the n-th subframe accompanied by the second SRS region configuration, and in the case of option 2-2, it is assumed that the PUSCH scheduling occurs in contiguous subframes. In this case, the manner in which the base station performs demodulation may be different.

Specifically, transmission of the PUSCH may be configured in the nth subframe and the n+1th subframe. The base station may demodulate the PUSCH received through the first slot in the n-th subframe using the demodulation reference signal of the n-th subframe. The base station may demodulate the PUSCH received through the last symbol of the second slot in the n-th subframe using the demodulation reference signal of the n+1th subframe that is the next subframe.

The UE may determine whether to perform rate-matching on PUSCH transmission for the last symbol of the n-th subframe according to whether the first SRS region of the n-th subframe is configured. Alternatively, the base station may configure or indicate such UE operation.

In options 1 to 2-2 described above, a slot-PUSCH or a subslot-PUSCH that exists for a short transmission time interval (short TTI) as well as rate-matching may be applied for PUSCH transmission. Further, a plurality of slot-PUSCHs or subslot-PUSCHs may be joint-scheduled and/or aggregated-scheduled, concatenated or separated in the time domain.

In the case of the physical uplink control channel (PUCCH), a similar method may be considered. For example, when the second SRS region occupies the second slot, the PUCCH may be transmitted only through the first slot in the form of 'slot-SPUCCH'.

In the case of PUCCH transmission considering the second SRS region, a single carrier property of the uplink may be considered. When PUCCH transmission occurs in a subframe in which the second SRS region is configured, the UE may transmit the PUCCH through symbol level time division multiplexing (symbol level TDM) at the second SRS region and symbol level. In this case, for PUCCH transmission, the slot-SPUCCHs or subslot-SPUCCHs may be joint-scheduled and/or aggregated-scheduled, concatenated or separated in the time domain.

Embodiment 4

The PUSCH rate-matching operation may be extended in a scheduled uplink subframe considering both the first SRS region and the second SRS region.

In the case of UE-specific SRS configuration, a set of new RRC parameter values according to the second SRS configuration may be configured independently from the UE-specific SRS according to the first SRS configuration. For example, when considering cell-edge UEs, an SRS repetition extending from the last symbol of the subframe to a plurality of symbols may be considered. Specifically, if the enhanced cell-specific SRS region is the second slot of the subframe, the base station may configure a UE specific multi symbol SRS from the last symbol of the corresponding slot. Further, the base station may indicate a starting symbol index and the number of SRS symbols to be transmitted considering resource utilization flexibility.

In summary, the base station may configure the starting symbol index (e.g., the last symbol) and the number of symbols transmitted via the UE-specific SRS region in the UE, considering the flexibility of UE-specific SRS allocation in terms of the cell. For example, two parameters, such as symbol duration and/or a number of repetitions (e.g., 1, 2, or 4) and a starting symbol index (e.g., 0-6), may be generated as RRC parameters.

The above-described embodiment may provide the advantage that a new UE-specific SRS according to the second SRS configuration may avoid a UE-specific SRS (legacy UE-specific SRS) according to the first SRS configuration on the same subframe having time domain resource multiplexing.

Embodiment 5

For better resource utilization flexibility, the second SRS region may be configured to be multiplexed with the first SRS region (legacy SRS region) in the time domain.

The second SRS region may be more flexibly configured in the UE at the symbol level in a time domain multiplexing manner. Through this, transmission of a PUSCH or PUCCH that may be scheduled in the same subframe may be more efficiently allocated.

For example, for resource element allocation for PUSCH transmission (PUSCH RE allocation), it may be advantageous to perform rate-matching only on actual UE-specific SRS symbols irrespective of the cell-specific SRS region. This is because the second SRS region is extended in at least one slot and may thus be a significant restriction to a potential PUSCH region.

However, such UE operations need to be dynamically controlled according to an instruction from the base station. Specifically, for the operation of the UE that performs rate-matching only on the UE-specific SRS region, the base station may indicate that transmission of the SRS from other UEs in the corresponding cell is not allocated.

In the case of the first SRS region, it is a default operation that rate-matching is performed on the corresponding region in PUSCH transmission.

In the case of the second SRS region, it is extended to a time domain region, and thus UL resources may be insufficient. Accordingly, in the PUSCH transmission by the UE, resource element mapping (RE mapping) for the PUSCH may be allowed, with the cell-specific SRS region invaded. Whether to allow such an operation may be indicated by the higher layer configuration of the base station.

Specifically, it may be indicated through MAC control element (CE) or may be dynamically indicated through downlink control information (DCI). For example, when the value of 1 bit of downlink control information (DCI) is '1', the UE may care or perform rate-matching only on UE-specific SRS symbols and transmit the PUSCH even in the cell-specific SRS region. When the 1-bit value of the downlink control information is '0', the UE may care or perform rate-matching on the whole cell-specific SRS region and transmit the PUSCH.

Here, 'care' means that it may be transmitted in the form of at least one of a slot-PUSCH, a subslot-PUSCH, an aggregated slot-PUSCH, or an aggregated subslot-PUSCH.

Embodiment 6

Given the additional influence on the downlink throughput reduction caused by the introduction of the second SRS region (e.g., one slot unit), the following may be considered for efficient uplink resource allocation.

Operations according to the above-described embodiments 1 to 5 are not limited only when the second SRS region is set to 1 slot or 1 subframe but may also be applied even when the second SRS region is configured in units of symbols so that the starting symbol index of the corresponding region (e.g., the last symbol) and the number of symbols included in the region may be flexibly configured.

The above-described embodiments are not limited as applied in one component carrier or one band, and may be extended and applied to intra-band carrier aggregation (intra-band CA) or inter-band carrier aggregation (inter-band CA).

Described below are matters depending on whether to adopt the concept of the cell-specific SRS in relation to the second SRS configuration (enhanced SRS configuration) based on the above-described embodiments.

For convenience of description, the case where the SRS is cell-specific and the case where the SRS is UE-specific depending on the first SRS configuration and the second SRS configuration are separately denoted as follows.

The SRS according to the first SRS configuration (legacy SRS configuration) is referred to as a legacy cell-specific SRS or a legacy UE-specific SRS.

The SRS according to the second SRS configuration (enhanced SRS configuration) is referred to as an enhanced cell-specific SRS or an enhanced UE-specific SRS.

The application range of the above-described embodiments may vary depending on whether an enhanced cell-specific SRS is configured through a higher layer.

If an enhanced cell-specific SRS is configured, a cell-specific SRS configured for rate-matching of a PUSCH like in legacy LTE may be used. In this case, the above-described embodiments 1 to 6 may be applied.

If no enhanced cell-specific SRS is configured, an enhanced UE-specific configuration may be configured or triggered only with the UE-specific SRS configuration. In this case, embodiments 3 to 6 may be applied to the enhanced UE-specific SRS.

More specifically, the enhanced UE-specific SRS may be transmitted in association with a subframe in which a legacy cell-specific SRS is configured.

The UE may transmit the enhanced UE-specific SRS using symbols other than the last symbol of the subframe in which a legacy cell-specific SRS is configured. Through this, the UE may prevent a collision between the enhanced UE-specific SRS and the legacy SRS.

According to an embodiment, the enhanced UE-specific SRS may be transmitted, time division multiplexed (TDMed) with the legacy cell-specific SRS.

According to an embodiment, the base station may UE-specifically configure or indicate to the UE whether the enhanced UE-specific SRS region includes the legacy cell-specific SRS region (i.e., the last symbol of the subframe).

According to an embodiment, when the enhanced UE-specific SRS collides with the legacy cell-specific SRS region (last symbol of the subframe) or the legacy UE-specific SRS, the enhanced UE-specific SRS may be set to be prioritized.

Further, in the case of the enhanced UE-specific SRS, the configuration according to embodiment 4 may be applied.

In embodiment 3, the embodiments (options 1, 2-1, and 2-2) related to the rate-matching of the PUSCH may be applied to the enhanced UE-specific SRS region or enhanced UE-specific SRS symbols when the enhanced cell-specific SRS is not configured. Additionally, the embodiment regarding PUCCH transmission in embodiment 3 may also be applied.

Described below in detail is a method for transmitting an enhanced SRS by a UE. Further, the embodiments described below are differentiated solely for ease of description, and some components in any one embodiment may be replaced, or combined with components of another embodiment.

An AP-SRS (Type 1 SRS) may be considered as a transmission method for an enhanced SRS having multiple symbols. In legacy LTE, aperiodic SRS (AP-SRS) is referred to as a trigger type 1 SRS and is triggered by various downlink control information formats (DCI formats). The aperiodic SRS is based on one shot SRS transmission (i.e., one transmission). Since the enhanced SRS mainly aims for downlink MIMO efficiency enhancement and SRS coverage/capacity enhancement, the purpose is difficult to achieve only by one shot SRS transmission according to the legacy configuration.

If a periodic SRS is supported for the enhanced SRS, the above object may be achieved. However, considering the overhead according to the configuration and preventing a collision between the enhanced SRS and the SRS transmitted from the legacy UE (or backward compatibility), the enhanced periodic SRS for which multiple symbols are to be supported may act as an overload on the network.

Given the above, the enhanced SRS needs to be transmitted in the form of an aperiodic SRS. A method for transmitting an enhanced SRS related thereto is described below in detail.

Embodiment A

A method in which the UE transmits the enhanced aperiodic SRS (AP-SRS) multiple times (m times) by (DCI) triggering once through single downlink control information may be considered.

The above-described embodiment means multi-shot SRS transmission over multiple subframes. The parameter m (natural number) related to the number of times of transmission of the enhanced SRS may be configured, as an RRC parameter, in the UE. When the enhanced aperiodic SRS (AP-SRS) is triggered by downlink control information (DCI), the parameter may be used.

The parameter m may be configured in combination with the SRS periodicity and/or subframe offset, which are the parameters of the enhanced aperiodic SRS (AP-SRS).

The parameter m, along with such parameters as the symbol duration, repetition value, and starting symbol index for the enhanced UE-specific SRS according to embodiment 5, may constitute parameter sets.

The downlink control information (DCI) may trigger the enhanced aperiodic SRS (AP-SRS) according to any one of the parameter sets. According to an embodiment, the downlink control information (DCI) may include a code point (e.g., 2 bits) for determining any one of the parameter sets.

The position (or subframe) in the time domain in which the enhanced aperiodic SRS (AP-SRS) is transmitted may be tied with the position (or subframe) in the time domain of the legacy cell-specific SRS or the enhanced cell-specific SRS (if present).

As another example, the SRS periodicity and/or subframe offset in the time domain in which the enhanced aperiodic SRS (AP-SRS) is transmitted may be tied with the position (or subframe) in the time domain of the legacy cell-specific SRS or the enhanced cell-specific SRS (if present).

The time domain parameter of the enhanced UE-specific SRS configured by the base station may also be tied with the position/subframe in the time domain of the legacy cell-specific SRS or the enhanced cell-specific SRS (if present).

According to an embodiment, the enhanced aperiodic SRS (AP-SRS) may be transmitted in subframes in the form of a subset of subframes in which a cell-specific SRS is configured.

According to an embodiment, a time domain parameter may be configured in a position i subframes away from the subframe in which a (legacy or enhanced) periodic SRS is transmitted. The enhanced aperiodic SRS (AP-SRS) may be transmitted in the configured position. The i value may be set by the base station as an RRC parameter.

For example, it is assumed that the periodicity of the (legacy or enhanced) periodic SRS is set to 10 ms and i is set to 5.

For example, the (legacy or enhanced) periodic SRS may be transmitted in a subframe, such as n+10/n+20/n+30 . . . , and the enhanced aperiodic SRS (AP-SRS) may be transmitted in a subframe, such as n+15/n+25/n+35 . . . . Based on the parameter m value, the UE may transmit the enhanced aperiodic SRS (AP-SRS) one or multiple times (one shot or multi-shot AP-SRS).

The multi-shot support of the enhanced aperiodic SRS (AP-SRS) as described above meets the purpose of enhancing SRS coverage/capacity, which is the main purpose of the enhanced SRS, and may protect (legacy or enhanced) periodic SRS transmission and prevent a collision with the legacy UE.

Embodiment B

A method for stopping transmission of a pre-configured legacy periodic SRS when the enhanced aperiodic SRS (AP-SRS) is triggered may be considered.

Specifically, the UE transmits the legacy periodic SRS based on a preset parameter. When the enhanced aperiodic SRS (AP-SRS) is triggered by the base station, the UE stops transmitting the legacy periodic SRS and transmits the enhanced aperiodic SRS (AP-SRS).

That is, the triggering of the enhanced aperiodic SRS (AP-SRS) may play a role to turn on/off the legacy periodic SRS. In this case, the transmission of the enhanced aperiodic SRS (AP-SRS) may include a plurality of transmissions (multi-shot transmission) according to embodiment A.

According to an embodiment, a DCI 1 bit field for whether to stop transmission of the legacy periodic SRS may be separately defined or may be joint-coded with a bit field for triggering the enhanced aperiodic SRS (AP-SRS), configuring a downlink control information format (DCI format).

For example, when the value of the DCI 1-bit field is '1', it may indicate to resume or continue transmission of the legacy periodic SRS. When the value of the DCI 1-bit field is '0', it may indicate to stop transmission of the legacy periodic SRS.

In this case, when the legacy periodic SRS is continuously transmitted according to the value of the DCI 1-bit field, the UE may operate as follows.

Enhanced aperiodic SRS (AP-SRS) transmission may be configured in the subframe in which the legacy periodic SRS is to be transmitted, or the position of the legacy periodic SRS may overlap, at the symbol level, with the position of the enhanced aperiodic SRS (AP-SRS) in the subframe. In this case, the UE may prioritize the enhanced aperiodic SRS (AP-SRS) over the legacy periodic SRS in the corresponding subframe. Specifically, the UE may drop the legacy periodic SRS and transmit the enhanced aperiodic SRS (AP-SRS).

Even if enhanced aperiodic SRS (AP-SRS) transmission is configured in the subframe in which the legacy periodic SRS is to be transmitted, if the two signals do not overlap at the symbol level, the UE may transmit both the signals.

In relation to the time of stopping the legacy aperiodic SRS, the UE may operate as follows.

An example in which the periodicity of the legacy periodic SRS is set to 10 ms is described below.

The UE transmits the legacy periodic SRS in a subframe, such as n+10/n+20/n+30 .... When the enhanced aperiodic SRS (AP-SRS) is triggered through downlink control information (DCI) between subframe n+10a and subframe n+10 (a+1), the UE may stop transmission of the legacy periodic SRS from n+10(a+1).

In order for the UE to resume transmission of the legacy periodic SRS, RRC signaling, RRC reconfiguration, or downlink control information (i.e., AP-SRS triggering) may be used.

Here, the effect of stopping the legacy periodic SRS (i.e., the time when the transmission of the corresponding SRS is stopped) may be determined depending on how many subframes before from the subframe in which the periodic SRS is to be transmitted the enhanced aperiodic SRS (AP-SRS) is triggered. That is, the time point (or subframe) at which the UE stops the legacy periodic SRS may be determined according to the time (subframe) at which the enhanced aperiodic SRS (AP-SRS) is triggered.

In this regard, the base station may set a subframe offset k.

According to an embodiment, subframe offset k may be information related to how many subframes after the UE receives the downlink control information (DCI) triggering the enhanced aperiodic SRS (AP-SRS) the enhanced aperiodic SRS (AP-SRS) is transmitted.

According to an embodiment, subframe offset k may be information related to how many subframes later the transmission of the legacy periodic SRS is stopped.

For example, the operation of the UE according to subframe offset k is described below in detail under the assumption that the legacy periodic SRS is to be transmitted in subframe n.

For example, when downlink control information (DCI) for triggering the enhanced aperiodic SRS (AP-SRS) is transmitted before n-k subframes (including the n-k subframes), the UE may stop the legacy periodic SRS transmission from n subframes.

When the corresponding downlink control information (DCI) is transmitted after the n-k subframes (without including the n-k subframes), the UE may transmit the legacy periodic SRS in the n subframes and may stop transmission of the legacy periodic SRS from a subframe (e.g., n+periodicity subframes) after the n subframes.

As another example, the stopping of the legacy periodic SRS may take effect k subframes (including the k subframes) after the UE receives the downlink control information (DCI) triggering the enhanced aperiodic SRS (AP-SRS).

After transmitting the corresponding downlink control information (DCI), the base station may monitor whether the UE transmits the periodic SRS or the aperiodic SRS (AP-SRS). The base station may implicitly know whether triggering of the enhanced aperiodic SRS (AP-SRS) according to previously transmitted downlink control information (DCI) is effective. Accordingly, the base station may re-trigger the enhanced aperiodic SRS (AP-SRS).

Through the above-described operations, it may be possible to prevent a collision between the legacy periodic SRS and the enhanced aperiodic SRS (AP-SRS) and SRS overlapped transmission and to reduce overhead.

Embodiments C and D below may be applied when an enhanced periodic SRS having multiple symbols is supported.

Embodiment C

A method for stopping transmission of an enhanced periodic SRS when the enhanced aperiodic SRS (AP-SRS) is triggered may be considered.

The UE transmits the enhanced periodic SRS based on a preset parameter. When the enhanced aperiodic SRS (AP-SRS) is triggered by the base station, the UE stops transmitting the enhanced periodic SRS.

That is, the triggering of the enhanced aperiodic SRS (AP-SRS) may play a role to turn on/off the enhanced periodic SRS. The resulting effects are similar to those according to embodiment A above.

The UE may periodically transmit an enhanced multi-symbol SRS in a multi-shot fashion. The periodic transmission of the enhanced multi-symbol SRS may be restricted by a triggering of the enhanced aperiodic SRS (AP-SRS).

According to an embodiment, a DCI 1 bit field for whether to stop transmission of the enhanced periodic SRS, which is pre-configured in the UE and is transmitted, may be separately defined or may be joint-coded with a bit field for triggering the enhanced aperiodic SRS (AP-SRS), configuring a downlink control information format (DCI format).

For example, when the value of the DCI 1-bit field is '1', it may indicate to resume or continue transmission of the legacy periodic SRS. When the value of the DCI 1-bit field is '0', it may indicate to stop transmission of the legacy periodic SRS.

In this case, when the legacy periodic SRS is continuously transmitted according to the value of the DCI 1-bit field, the UE may operate as follows.

Enhanced aperiodic (AP-SRS) transmission may be configured in the subframe in which the enhanced periodic SRS is to be transmitted, or the position of the enhanced periodic SRS may overlap, at the symbol level, with the position of the enhanced aperiodic SRS (AP-SRS) in the subframe. In this case, the UE may prioritize the enhanced aperiodic SRS (AP-SRS) over the enhanced periodic SRS in the corresponding subframe. Specifically, the UE may drop the enhanced periodic SRS and transmit the enhanced aperiodic SRS (AP-SRS).

Even if enhanced aperiodic SRS (AP-SRS) transmission is configured in the subframe in which the enhanced periodic SRS is to be transmitted, if the two signals do not overlap at the symbol level, the UE may transmit both the signals.

In relation to the time of stopping the enhanced aperiodic SRS, the UE may operate as follows.

An example in which the periodicity of the enhanced periodic SRS is set to 10 ms is described below.

The UE transmits the enhanced periodic SRS in a subframe, such as n+10/n+20/n+30 . . . . When the enhanced aperiodic SRS (AP-SRS) is triggered through downlink control information (DCI) between subframe n+10a and subframe n+10(a+1), the UE may stop transmission of the enhanced periodic SRS from n+10(a+1).

In order for the UE to resume transmission of the enhanced periodic SRS, RRC signaling, RRC reconfiguration, or downlink control information (i.e., AP-SRS triggering) may be used.

The same manner as in embodiment B may be applied to the effect of the enhanced periodic SRS (that is, the time when the transmission of the corresponding SRS is stopped).

Embodiment D

The UE may transmit the enhanced SRS based on a pre-configured parameter, and a method in which the SRS is not transmitted when a PUSCH is scheduled in the subframe in which the enhanced SRS is to be transmitted may be considered.

When transmission of the PUSCH of a UE (enhanced UE) supporting the enhanced SRS configuration is scheduled, the UE (enhanced UE) may stop the SRS transmission. The subframe may be used as a resource for PUSCH transmission of the UE (enhanced UE) or a resource for SRS transmission of a legacy UE. That is, the PUSCH scheduling for the enhanced UE plays a role to turn on/off the enhanced periodic SRS.

The above-described embodiment may be applied to subframes in which other SRSs (e.g., the enhanced aperiodic SRS (AP-SRS), legacy cell-specific SRS, or enhanced cell-specific SRS) are to be transmitted, as well as the subframe in which the enhanced periodic SRS is to be transmitted.

For example, it is assumed in the following description that transmission of an enhanced periodic SRS or an enhanced aperiodic SRS (AP-SRS) of an enhanced UE is configured in the subframe configured as a legacy cell-specific SRS region.

If PUSCH scheduling occurs to the UE in the corresponding subframe, the UE may transmit the PUSCH without transmitting the enhanced SRS. In the corresponding PUSCH, since the last symbol of the subframe is rate-matched by the legacy cell-specific SRS configuration, the legacy UE may transmit the SRS in the corresponding last symbol.

The embodiments have the following effects. First, it is possible to temporarily suspend transmission of the periodic SRS, thereby reducing overhead. Second, in the time division duplex (TDD) system, when resources for PUSCH transmission of an enhanced UE are insufficient, priority is given to the PUSCH to enable UL data transmission of the enhanced UE. Third, an enhanced UE and a legacy UE may coexist, and accordingly, a legacy SRS may be protected.

In terms of implementation, operations of the base station/UE according to the above-described embodiments (e.g., operations related to at least one of embodiments 1 to 7 and A to D) may be processed by the devices (e.g., the processors 102 and 202 of FIG. 11) of FIGS. 10 to 14 described below.

Further, operations of the base station/UE according to the above-described embodiments (e.g., operations related to at least one of embodiments 1 to 7 and A to D) may be stored in a memory (e.g., 104 or 204 of FIG. 11) in the form of instructions/program (e.g., instructions or executable code) for driving at least one processor (e.g., 102 or 202 of FIG. 11).

A method for transmitting an SRS by a UE in a wireless communication system based on the above-described embodiments is described below in detail with reference to FIGS. 6 and 7.

FIG. 6 is a flowchart illustrating a method for transmitting an SRS by a UE in a wireless communication system according to an embodiment of the disclosure.

Referring to FIG. 6, according to an embodiment of the disclosure, a method for transmitting a sounding reference signal (SRS) by a UE in a wireless communication system may include the step S610 of receiving a higher layer message, the step S620 of receiving downlink control information (DCI) to trigger the SRS, and the step S630 of transmitting the SRS.

In S610, the UE receives a higher layer message (e.g., an RRC message) from the base station. The higher layer message may include configuration information related to the SRS. The SRS may be an enhanced aperiodic SRS (AP-SRS).

According to an embodiment, the configuration information related to the SRS may include a plurality of configuration sets related to at least one of a number of times of transmission of the SRS, a subframe in which the SRS is transmitted, a mapping start symbol of the SRS, and/or a time duration in which the SRS is transmitted. For example, each of the plurality of configuration sets may include information related to the number of transmissions of the SRS and the subframe through which the SRS is transmitted. The plurality of configuration sets may be parameter sets according to embodiment A described above.

According to an embodiment, the higher layer message may further includes information for subframes in which a cell-specific SRS is configured. The position of the subframe in which the SRS is transmitted may be associated with a position of at least one of the subframes in which the cell-specific SRS is configured.

According to an embodiment, the subframe in which the SRS is transmitted may be any one of the subframes in which the cell-specific SRS is configured. The SRS may be an aperiodic SRS (AP-SRS).

According to an embodiment, the configuration information related to the SRS may further include a subframe offset for a position of any one of the subframes in which the cell-specific SRS is configured. The subframe in which the SRS is transmitted may be determined depending on the subframe offset. The SRS may be an aperiodic SRS (AP-SRS). The subframe offset may be an i value according to the above-described embodiment A.

According to an embodiment, the subframe related to the subframe offset among the subframes in which the cell-specific SRS is configured may be a subframe in which a periodic SRS is configured.

According to the above-described S610, the operation of the UE (100/200 of FIGS. 10 to 14) receiving the higher layer message from the base station (100/200 of FIGS. 10 to 14) may be implemented by the device of FIGS. 10 to 14. For example, referring to FIG. 11, one or more processors 102 may control one or more transceivers 106 and/or one or more memories 104 to receive the higher layer message from the base station 200.

In S620, the UE receives downlink control information (DCI) for triggering transmission of the SRS from the base station.

According to an embodiment, the downlink control information (DCI) may include information representing any one of the plurality of configuration sets.

According to the above-described S620, the operation of the UE (100/200 of FIGS. 10 to 14) receiving the downlink control information (DCI) for triggering the transmission of the SRS from the base station (100/200 of FIGS. 10 to 14) may be implemented by the device of FIGS. 10 to 14. For example, referring to FIG. 11, one or more processors 102 may control one or more transceivers 106 and/or one or more memories 104 to receive the downlink control information (DCI) triggering transmission of the SRS from the base station 200.

In S630, the UE may transmit the SRS to the base station based on the downlink control information (DCI).

According to an embodiment, the SRS may be an aperiodic SRS and may be repeatedly transmitted in a plurality of subframes through a plurality of contiguous symbols. Specifically, the UE may transmit the SRS at least two or more times, i.e., in at least two or more subframes according to the configuration set determined by the downlink control information.

According to the above-described S630, the operation of the UE (100/200 of FIGS. 10 to 14) transmitting the SRS to the base station (100/200 of FIGS. 10 to 14) based on the downlink control information (DCI) may be implemented by the device of FIGS. 10 to 14. For example, referring to FIG. 11, one or more processors 102 may control one or more transceivers 106 and/or one or more memories 104 to transmit the SRS to the base station 200 based on the downlink control information (DCI).

A case in which the UE transmits a periodic SRS and an enhanced aperiodic SRS (AP-SRS) is described below in detail with reference to FIG. 7.

FIG. 7 is a flowchart illustrating a method for transmitting an SRS by a UE in a wireless communication system according to another embodiment of the disclosure.

Referring to FIG. 7, according to an embodiment of the disclosure, a method for transmitting a sounding reference signal (SRS) by a UE in a wireless communication system may include the step S710 of receiving a higher layer message, the step S720 of transmitting a periodic SRS, the step S730 of receiving downlink control information (DCI) to trigger an aperiodic SRS, and the step S740 of transmitting the aperiodic SRS. Since S710, S730, and S740 correspond to S610, S620, and S630 described above, no detailed description thereof is given.

In S710, the UE receives a higher layer message from the base station. The higher layer message may include configuration information related to the aperiodic SRS. The configuration information related to the aperiodic SRS corresponds to the configuration information related to the SRS of FIG. 6. In other words, the aperiodic SRS may be an enhanced aperiodic SRS (AP-SRS).

According to an embodiment, the higher layer message may further include configuration information related to the periodic SRS.

According to the above-described S710, the operation of the UE (100/200 of FIGS. 10 to 14) receiving the higher layer message from the base station (100/200 of FIGS. 10 to 14) may be implemented by the device of FIGS. 10 to 14. For example, referring to FIG. 11, one or more processors 102 may control one or more transceivers 106 and/or one or more memories 104 to receive the higher layer message from the base station 200.

In S720, the UE transmits the periodic SRS to the base station. According to an embodiment, the periodic SRS may be transmitted through one symbol or a plurality of contiguous symbols. That is, the periodic SRS may be a legacy periodic SRS or an enhanced periodic SRS.

According to an embodiment, when a physical uplink shared channel (PUSCH) is scheduled in any one of subframes determined according to the configuration information related to the periodic SRS, the UE may not transmit the periodic SRS in the corresponding subframe.

According to the above-described S720, the operation of the UE (100/200 of FIGS. 10 to 14) transmitting the periodic SRS to the base station (100/200 of FIGS. 10 to 14) may be implemented by the device of FIGS. 10 to 14. For example, referring to FIG. 11, one or more processors 102 may control one or more transceivers 106 and/or one or more memories 104 to transmit the periodic SRS to the base station 200.

In S730, the UE receives downlink control information (DCI) for triggering transmission of the aperiodic SRS from the base station.

According to an embodiment, the downlink control information (DCI) may further include information indicating whether to stop the transmission of the periodic SRS. For example, the information may be defined as a 1-bit field in the downlink control information (DCI). When the value of the 1-bit field is 1, the corresponding information may indicate to resume or continue transmission of the periodic SRS. When the value of the 1-bit field is 0, the corresponding information may indicate to stop transmission of the periodic SRS.

According to an embodiment, the downlink control information (DCI) may further include information related to a time point at which transmission of the periodic SRS is stopped. The information may be a subframe offset k related to the above-described embodiment B or C.

According to the above-described S730, the operation of the UE (100/200 of FIGS. 10 to 14) receiving the downlink control information (DCI) for triggering the transmission of the aperiodic SRS from the base station (100/200 of FIGS. 10 to 14) may be implemented by the device of FIGS. 10 to 14. For example, referring to FIG. 11, one or more processors 102 may control one or more transceivers 106 and/or one or more memories 104 to receive the downlink control information (DCI) triggering transmission of the aperiodic SRS from the base station 200.

In S740, the UE may transmit the aperiodic SRS to the base station based on the downlink control information (DCI).

According to an embodiment, when a physical uplink shared channel (PUSCH) is scheduled in any one of subframes determined according to the configuration information related to the aperiodic SRS, the UE may not transmit the aperiodic SRS in the corresponding subframe.

According to the above-described S740, the operation of the UE (100/200 of FIGS. 10 to 14) transmitting the aperiodic SRS to the base station (100/200 of FIGS. 10 to 14) based on the downlink control information (DCI) may be implemented by the device of FIGS. 10 to 14. For example, referring to FIG. 11, one or more processors 102 may control one or more transceivers 106 and/or one or more memories 104 to transmit the SRS to the base station 200 based on the downlink control information (DCI).

A method for receiving an SRS by a base station in a wireless communication system based on the above-described embodiments is described below in detail with reference to FIGS. 8 and 9.

FIG. 8 is a flowchart illustrating a method for receiving an SRS by a base station in a wireless communication system according to an embodiment of the disclosure.

Referring to FIG. 8, according to an embodiment of the disclosure, a method for receiving a sounding reference signal (SRS) by a base station in a wireless communication system may include the step S810 of transmitting a higher layer message, the step S820 of transmitting downlink control information (DCI) to trigger the SRS, and the step S830 of receiving the SRS.

In S810, the base station transmits a higher layer message (e.g., an RRC message) to the UE. The higher layer message may include configuration information related to the SRS. The SRS may be an enhanced aperiodic SRS (AP-SRS).

According to an embodiment, the configuration information related to the SRS may include a plurality of configuration sets related to at least one of a number of times of transmission of the SRS, a subframe in which the SRS is transmitted, a mapping start symbol of the SRS, and/or a time duration in which the SRS is transmitted. For example, each of the plurality of configuration sets may include information related to the number of transmissions of the SRS and the subframe through which the SRS is transmitted. The plurality of configuration sets may be parameter sets according to embodiment A described above.

According to an embodiment, the higher layer message may further includes information for subframes in which a cell-specific SRS is configured. The position of the subframe in which the SRS is transmitted may be associated with a position of at least one of the subframes in which the cell-specific SRS is configured.

According to an embodiment, the subframe in which the SRS is transmitted may be any one of the subframes in which the cell-specific SRS is configured. The SRS may be an aperiodic SRS (AP-SRS).

According to an embodiment, the configuration information related to the SRS may further include a subframe offset for a position of any one of the subframes in which the cell-specific SRS is configured. The subframe in which the SRS is transmitted may be determined depending on the subframe offset. The SRS may be an aperiodic SRS (AP-SRS). The subframe offset may be an i value according to the above-described embodiment A.

According to an embodiment, the subframe related to the subframe offset among the subframes in which the cell-specific SRS is configured may be a subframe in which a periodic SRS is configured.

According to the above-described S810, the operation of the base station (100/200 of FIGS. 10 to 14) transmitting the higher layer message to the UE (100/200 of FIGS. 10 to 14) may be implemented by the device of FIGS. 10 to 14. For example, referring to FIG. 11, one or more processors 202 may control one or more transceivers 206 and/or one or more memories 204 to transmit the higher layer message to the UE 100.

In S820, the base station transmits downlink control information (DCI) for triggering transmission of the SRS to the UE.

According to an embodiment, the downlink control information (DCI) may include information representing any one of the plurality of configuration sets.

According to the above-described S820, the operation of the base station (100/200 of FIGS. 10 to 14) transmitting the downlink control information (DCI) for triggering the transmission of the SRS to the UE (100/200 of FIGS. 10 to 14) may be implemented by the device of FIGS. 10 to 14. For example, referring to FIG. 11, one or more processors 202 may control one or more transceivers 206 and/or one or more memories 204 to transmit the downlink control information (DCI) triggering transmission of the SRS to the UE 100.

In S830, the base station may receive the SRS from the UE based on the downlink control information (DCI).

According to an embodiment, the SRS may be an aperiodic SRS and may be repeatedly received in a plurality of subframes through a plurality of contiguous symbols. Specifically, the base station may receive the SRS at least two or more times, i.e., in at least two or more subframes according to the configuration set determined by the downlink control information.

According to the above-described S830, the operation of the base station (100/200 of FIGS. 10 to 14) receiving the SRS from the UE (100/200 of FIGS. 10 to 14) based on the downlink control information (DCI) may be implemented by the device of FIGS. 10 to 14. For example, referring to FIG. 11, one or more processors 202 may control one or more transceivers 206 and/or one or more memories 204 to receive the SRS from the UE 100 based on the downlink control information (DCI).

A case in which the base station receives a periodic SRS and an enhanced aperiodic SRS (AP-SRS) from the UE is described below in detail with reference to FIG. 9.

FIG. 9 is a flowchart illustrating a method for receiving an SRS by a base station in a wireless communication system according to another embodiment of the disclosure.

Referring to FIG. 9, according to another embodiment of the disclosure, a method for receiving a sounding reference signal (SRS) by a base station in a wireless communication system may include the step S910 of transmitting a higher layer message, the step S920 of receiving a periodic SRS, the step S930 of transmitting downlink control information (DCI) to trigger an aperiodic SRS, and the step S940 of receiving the aperiodic SRS. Since S910, S930, and S940 correspond to S810, S820, and S830 described above, no detailed description thereof is given.

In S910, the base station transmits a higher layer message to the UE. The higher layer message may include configuration information related to the aperiodic SRS. The configuration information related to the aperiodic SRS corresponds to the configuration information related to the SRS of FIG. 8. In other words, the aperiodic SRS may be an enhanced aperiodic SRS (AP-SRS).

According to an embodiment, the higher layer message may further include configuration information related to the periodic SRS. According to the above-described S910, the operation of the base station (100/200 of FIGS. 10 to 14) transmitting the higher layer message to the UE (100/200 of FIGS. 10 to 14) may be implemented by the device of FIGS. 10 to 14. For example, referring to FIG. 11, one or more processors 202 may control one or more transceivers 206 and/or one or more memories 204 to transmit the higher layer message to the UE 100.

In S920, the base station receives the periodic SRS from the UE. According to an embodiment, the periodic SRS may be received through one symbol or a plurality of contiguous symbols. That is, the periodic SRS may be a legacy periodic SRS or an enhanced periodic SRS.

According to an embodiment, when a physical uplink shared channel (PUSCH) is scheduled in any one of subframes determined according to the configuration information related to the periodic SRS, the base station may not predict to receive the periodic SRS in the corresponding subframe. That is, the base station may receive the PUSCH according to the scheduling from the UE in the corresponding subframe.

According to the above-described S920, the operation of the base station (100/200 of FIGS. 10 to 14) receiving the periodic SRS from the UE (100/200 of FIGS. 10 to 14) may be implemented by the device of FIGS. 10 to 14. For example, referring to FIG. 11, one or more processors 202 may control one or more transceivers 206 and/or one or more memories 204 to receive the periodic SRS from the UE 100.

In S930, the base station transmits downlink control information (DCI) for triggering transmission of the aperiodic SRS to the UE.

According to an embodiment, the downlink control information (DCI) may further include information indicating whether to stop the transmission of the periodic SRS. For example, the information may be defined as a 1-bit field in the downlink control information (DCI). When the value of the 1-bit field is 1, the corresponding information may indicate to resume or continue transmission of the periodic SRS. When the value of the 1-bit field is 0, the corresponding information may indicate to stop transmission of the periodic SRS.

According to an embodiment, the downlink control information (DCI) may further include information related to a time point at which transmission of the periodic SRS is stopped. The information may be a subframe offset k according to the above-described embodiment B or C.

According to the above-described S930, the operation of the base station (100/200 of FIGS. 10 to 14) transmitting the downlink control information (DCI) for triggering the transmission of the aperiodic SRS to the UE (100/200 of FIGS. 10 to 14) may be implemented by the device of FIGS. 10 to 14. For example, referring to FIG. 11, one or more processors 202 may control one or more transceivers 206 and/or one or more memories 204 to transmit the downlink control information (DCI) triggering transmission of the aperiodic SRS to the UE 100.

In S940, the base station may receive the aperiodic SRS from the UE based on the downlink control information (DCI).

According to an embodiment, when a physical uplink shared channel (PUSCH) is scheduled in any one of subframes determined according to the configuration information related to the aperiodic SRS, the base station may not predict to receive the aperiodic SRS in the corresponding subframe. That is, the base station may receive the PUSCH according to the scheduling from the UE in the corresponding subframe.

According to the above-described S940, the operation of the base station (100/200 of FIGS. 10 to 14) receiving the aperiodic SRS from the UE (100/200 of FIGS. 10 to 14) based on the downlink control information (DCI) may be implemented by the device of FIGS. 10 to 14. For example, referring to FIG. 11, one or more processors 202 may control one or more transceivers 206 and/or one or more memories 204 to receive the aperiodic SRS from the UE 100 based on the downlink control information (DCI).

Example of Wireless Communication System Applied to the Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 10 illustrates a communication system 1 applied to the disclosure.

Referring to FIG. 10, a communication system 1 applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Example of Wireless Device Applied to the Disclosure.

FIG. 11 illustrates wireless devices applicable to the disclosure.

Referring to FIG. 11, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 10.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Disclosure

FIG. 12 illustrates a signal process circuit for a transmission signal.

Referring to FIG. 12, a signal processing circuit 1000 may include scramblers 1010, modulators 1020, a layer mapper 1030, a precoder 1040, resource mappers 1050, and signal generators 1060. An operation/function of FIG. 12 may be performed, without being limited to, the processors 102 and 202 and/or the transceivers 106 and 206 of FIG. 11. Hardware elements of FIG. 12 may be implemented by the processors 102 and 202 and/or the transceivers 106 and 206 of FIG. 11. For example, blocks 1010 to 1060 may be implemented by the processors 102 and 202 of FIG. 11. Alternatively, the blocks 1010 to 1050 may be implemented by the processors 102 and 202 of FIG. 11 and the block 1060 may be implemented by the transceivers 106 and 206 of FIG. 11.

Codewords may be converted into radio signals via the signal processing circuit 1000 of FIG. 12. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT)

for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 12. For example, the wireless devices (e.g., 100 and 200 of FIG. 11) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Disclosure

FIG. 13 illustrates another example of a wireless device applied to the disclosure.

The wireless device may be implemented in various forms according to a use-case/service (refer to FIG. 10). Referring to FIG. 13, wireless devices 100 and 200 may correspond to the wireless devices 100 and 200 of FIG. 11 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 11. For example, the transceiver(s) 114 may include the one or more transceivers 106 and 206 and/or the one or more antennas 108 and 208 of FIG. 11. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 10), the vehicles (100*b*-1 and 100*b*-2 of FIG. 10), the XR device (100*c* of FIG. 10), the hand-held device (100*d* of FIG. 10), the home appliance (100*e* of FIG. 10), the IoT device (100*f* of FIG. 10), a digital broadcast terminal, a hologram device, a public safety device, an MTC device, a medicine device, a fintech device (or a finance device), a security device, a climate/environment device, the AI server/device (400 of FIG. 10), the BSs (200 of FIG. 10), a network node, etc. The wireless device may be used in a mobile or fixed place according to a use-example/service.

In FIG. 13, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Disclosure

FIG. 14 illustrates a hand-held device applied to the disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 14, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 13, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects achievable by methods and devices for transmitting and receiving an SRS in a wireless communication system according to an embodiment of the disclosure are described below.

According to an embodiment of the disclosure, an SRS triggered by downlink control information (DCI) is repeatedly transmitted in a plurality of subframes through a plurality of contiguous symbols. Accordingly, the disclosure may reduce the load on the network by aperiodically transmitting an SRS of multiple symbols and enhance the coverage and the capacity of the SRS by transmitting the SRS at least two or more times.

Further, according to an embodiment of the disclosure, the location of the subframe of the SRS is related to the location of at least one subframe among subframes in which a cell-specific SRS has been configured. Specifically, the subframe of the SRS may be any one of subframes in which the cell-specific SRS has been configured or a subframe determined according to a specific subframe offset. The subframe offset is related to a subframe in which a periodic SRS has been configured among the subframes in which the cell-specific SRS has been configured. Accordingly, the disclosure may prevent a collision with a legacy UE that transmits the SRS in a conventional manner in transmitting the aperiodic SRS through a plurality of contiguous symbols.

Further, according to an embodiment of the disclosure, the downlink control information (DCI) includes information indicating whether to stop transmission of the SRS periodically transmitted. When the aperiodic SRS is triggered, transmission of the periodic SRS may be stopped. Accordingly, the disclosure may prevent a collision between the periodic SRS being transmitted and the triggered aperiodic SRS and may reduce the overhead of SRS transmission.

Further, according to an embodiment of the disclosure, when a physical uplink shared channel (PUSCH) is scheduled in any one of subframes determined according to the configuration information related to the aperiodic SRS or the configuration information related to the periodic SRS, the UE does not transmit the aperiodic SRS or the periodic SRS in the corresponding subframe. Accordingly, according to the disclosure, as the SRS is transmitted through a plurality of symbols, it is possible to prevent a shortage of uplink resources for PUSCH transmission and to reduce overhead by stopping the transmission of the SRS while the corresponding PUSCH is transmitted.

The embodiments of the disclosure described hereinbelow are combinations of elements and features of the disclosure. The elements or features may be considered selective unless otherwise mentioned. Each element or feature may be practiced without being combined with other elements or features. Further, an embodiment of the disclosure may be constructed by combining parts of the elements and/or features. Operation orders described in embodiments of the disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the disclosure or included as a new claim by subsequent amendment after the application is filed.

The embodiments of the disclosure may be achieved by various means, for example, hardware, firmware, software, or a combination thereof. In a hardware configuration, the methods according to the embodiments of the disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the disclosure may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method for transmitting a sounding reference signal (SRS) by a user equipment (UE) in a wireless communication system, the method comprising:
   receiving a higher layer message including configuration information including a number of times of transmission of an aperiodic SRS (AP-SRS), a subframe in which a periodic SRS is transmitted, and an AP-SRS subframe offset of the AP-SRS related to the subframe in which the periodic SRS is transmitted;
   performing a first transmission of a periodic SRS based on the configuration information;
   receiving downlink control information (DCI) triggering a second transmission of the AP-SRS; and
   in response to the DCI, stopping the first transmission of the periodic SRS, and performing the second transmission of the AP-SRS in a plurality of subframes based on the configuration information.

2. The method of claim 1,
   wherein the higher layer message further includes information for subframes in which a cell-specific SRS is configured, and
   wherein a position of a subframe in which the aperiodic SRS is transmitted is associated with a position of at least one of the subframes in which the cell-specific SRS is configured.

3. The method of claim 2, wherein the subframe in which the aperiodic SRS is transmitted is any one of the subframes in which the cell-specific SRS is configured.

4. The method of claim 2, wherein the configuration information related to the SRS further includes a subframe offset for a position of any one of the subframes in which the cell-specific SRS is configured, and
wherein the subframe in which the aperiodic SRS is transmitted is determined depending on the subframe offset.

5. The method of claim 4, wherein a subframe related to the subframe offset among the subframes in which the cell-specific SRS is configured is a subframe in which a periodic SRS is configured.

6. The method of claim 1, wherein the periodic SRS is transmitted via one symbol or a plurality of contiguous symbols.

7. The method of claim 6, wherein when a physical uplink shared channel (PUSCH) is scheduled in any one of subframes determined according to the configuration information related to the periodic SRS or the configuration information related to the aperiodic SRS, the aperiodic SRS or the periodic SRS is not transmitted in the subframe.

8. The method of claim 1, wherein the downlink control information (DCI) further includes information related to a time point when the transmission of the periodic SRS is stopped.

9. A user equipment (UE) transmitting a sounding reference signal (SRS) in a wireless communication system, the UE comprising:
one or more transceivers;
one or more processors; and
one or more memories operably connectible to the one or more processors and storing instructions to, when executed by the one or more processors, perform operations, wherein the operations comprise:
receiving a higher layer message including configuration information including a number of times of transmission of an aperiodic SRS (AP-SRS), a subframe in which a periodic SRS is transmitted, and an AP-SRS subframe offset of the AP-SRS related to the subframe in which the periodic SRS is transmitted;
performing a first transmission of a periodic SRS based on the configuration information;
receiving downlink control information (DCI) triggering a second transmission of the AP-SRS; and
in response to the DCI, stopping the first transmission of the periodic SRS, and performing the second transmission of the AP-SRS in a plurality of subframes based on the configuration information.

10. The UE of claim 9, wherein the higher layer message further includes information for subframes in which a cell-specific SRS is configured, and
wherein a position of a subframe in which the aperiodic SRS is transmitted is associated with a position of at least one of the subframes in which the cell-specific SRS is configured.

11. The UE of claim 10, wherein the configuration information related to the SRS further includes a subframe offset for a position of any one of the subframes in which the cell-specific SRS is configured, and
wherein the subframe in which the aperiodic SRS is transmitted is determined depending on the subframe offset.

12. The UE of claim 9, wherein the periodic SRS is transmitted via one symbol or a plurality of contiguous symbols.

13. A device including one or more memories and one or more processors functionally connected with the one or more memories, wherein the one or more processors are configured to control the device to:
receive a higher layer message including configuration information including a number of times of transmission of an aperiodic SRS (AP-SRS), a subframe in which a periodic SRS is transmitted, and an AP-SRS subframe offset of the AP-SRS related to the subframe in which the periodic SRS is transmitted;
perform a first transmission of a periodic SRS based on the configuration information;
receive downlink control information (DCI) triggering a second transmission of the AP-SRS; and
in response to the DCI, stop the first transmission of the periodic SRS, and performing the second transmission of the AP-SRS in a plurality of subframes based on the configuration information.

* * * * *